United States Patent
Lee et al.

(10) Patent No.: US 7,598,951 B2
(45) Date of Patent: Oct. 6, 2009

(54) MULTIPLE EFFECT EXPRESSION METHOD AND APPARATUS IN 3-DIMENSION GRAPHIC IMAGE

(75) Inventors: Keechang Lee, Yongin-si (KR); Dokyoon Kim, Seongnam-si (KR); Jeonghwan Ahn, Suwon-si (KR); Seyoon Tak, Yongin-si (KR); Sangoak Woo, Anyang-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 497 days.

(21) Appl. No.: 11/356,082

(22) Filed: Feb. 17, 2006

(65) Prior Publication Data

US 2006/0181528 A1    Aug. 17, 2006

(30) Foreign Application Priority Data

Feb. 17, 2005    (KR) .................... 10-2005-0013142

(51) Int. Cl.
*G06T 15/00* (2006.01)
(52) U.S. Cl. .................. 345/419; 345/423; 345/426; 345/428; 345/581; 345/582; 345/584; 345/587; 345/591; 345/592; 345/619; 345/629
(58) Field of Classification Search ............. 345/419, 345/423, 426, 428, 581, 582, 584, 587, 591, 345/592, 593, 619, 629
See application file for complete search history.

(56) References Cited

U.S. PATENT DOCUMENTS

| 6,611,262 | B1* | 8/2003 | Suzuki ................. 345/419 |
| 6,771,264 | B1* | 8/2004 | Duluk et al. ........... 345/426 |
| 6,906,714 | B2* | 6/2005 | Grzeszczuk et al. ..... 345/420 |

* cited by examiner

*Primary Examiner*—Kimbinh T Nguyen
(74) *Attorney, Agent, or Firm*—Staas & Halsey LLP

(57) ABSTRACT

A method and apparatus for synthesizing and expressing multiple effects and textures in a 3-dimensional graph image. The method includes: defining nodes in VRML (Virtual Reality Modeling Language), the nodes being used to express multiple effects; inputting VRML files corresponding to the defined nodes, the VRML files having information on the 3-dimensional image and the multiple effects to be expressed in the 3-dimensional image; generating the 3-dimensional image by using the input VRML files; and expressing the multiple effects in the generated 3-dimensional image by using the information on the multiple effects in the input VRML files. Accordingly, the VRML nodes and fields are defined to synthesize multiple effects and multiple textures in the 3-dimensional image, so that it is possible to effectively apply the multiple effects and multiple texture effects in the 3-dimensional image in cooperation with a conventional 3-dimensional image expression method and apparatus. Accordingly, it is possible to apply the multiple effects or the multiple texture effects in the 3-dimensional image by a user simply designating the multiple effects or the multiple texture effects.

41 Claims, 13 Drawing Sheets

MULTIPLE EFFECT EXPRESSION METHOD AND APPARATUS IN 3-DIMENSION GRAPHIC IMAGE

CROSS-REFERENCE TO RELATED APPLICATION

This application claims the benefit of Korean Patent Application No. 10-2005-0013142, filed on Feb. 17, 2005, in the Korean Intellectual Property Office, the disclosure of which is incorporated herein by reference.

BACKGROUND OF THE INVENTION

1. Field of the Invention

The present invention relates to a 3-dimensional image expression method and apparatus, and more particularly, to a 3-dimensional image expression method and apparatus for defining virtual reality modeling language (VRML) nodes and fields and synthesizing and expressing multiple effects and multiple textures in a 3-dimensional image by using the defined VRML nodes and fields.

2. Description of Related Art

A virtual reality modeling language (VRML) is a standard language for expressing a 3-dimensional graphic image in the Internet. In order to express the 3-dimensional graphic image by using the VRML, there is a need to define nodes as basic elements constituting VRML objects and specific values constituting each of the nodes and fields designating the nodes.

A VRML standard defines the basic nodes. A user may define new nodes as prototypes in order to extend nodes in addition to the defined basic nodes.

FIG. 1 shows a structure of nodes basically defined in accordance with the VRML standard. The nodes include Shape, Geometry, Appearance TextureCoordinate, Material, TextureTransform, ImageTexture, PixelTexture, and Movie Texture nodes. The Shape is a root node for generating a 3-dimensional object. The Geometry node designates a shape of the 3-dimensional object. The Appearance node designates an appearance of the 3-dimensional object. The TextureCoordinate node designates coordinates of textures expressed in the appearance of the 3-dimensional object. The Material node designates attributes such as colors of the appearance of the 3-dimensional object. The TextureTransform node designates a transform of the textures. The ImageTexture defines a texture map to be expressed on the 3-dimensional object by using a still image. The PixelTexture node defines a texture map to be expressed on the 3-dimensional object by using a point image. The MovieTexture node defines a time-varying texture map by using a moving picture image. The three texture-associated nodes are designated by using texture fields included in the Appearance node. These nodes include fields defined to designate specific values for expressing the 3-dimensional object and other nodes.

Now, a method of expressing the 3-dimensional image based on the defined VRML nodes and fields will be described.

The user writes a VRML file in accordance with the defined nodes and fields in order to express the 3-dimensional image. The user uses a VRML browser to read out the written VRML file. A parser included in the browser analyses the read-out VRML file to identify internal nodes basically defined in the VRML standard and the newly-user-defined prototype nodes. The VRML browser generates a transformation hierarchy and a route graph by using a result of the VRML file analysis. An execution engine included in the VRML browser output an original appearance of the 3-dimensional image on a screen and waits for a user's input. The execution engine processes events defined in the nodes with reference to the generated route graph and outputs the transformed 3-dimensional image on the screen.

In order to express the 3-dimensional graph image, there is a need for a multiple effect expression method and apparatus for synthesizing and expressing user's desired multiple effects or textures in the 3-dimensional image. In addition, since the VRML nodes shown in FIG. 1 support only the simple texture expression, there is a need to define nodes and fields for expressing the multiple effects or textures in the 3-dimensional image by using the VRML, that is, a standard image expression language. In addition, there is a need for a method and apparatus for expressing the effects and textures in the 3-dimensional image by using the defined nodes and fields.

BRIEF SUMMARY

An aspect of the present invention provides a method and apparatus for synthesizing and expressing multiple textures in a 3-dimensional image, An aspect of the present invention also provides a 3-dimensional image expression method of defining VRML nodes and files for expressing multiple effects and textures in a 3-dimensional image and generating nodes and fields by using the VRML nodes and fields.

An aspect of the present invention also provides a method and apparatus for inputting VRML files written by using the aforementioned defined VRML nodes and fields and expressing multiple effects and textures in a 3-dimensional image.

According to an aspect of the present invention, there is provided a method of expressing effects in a 3-dimensional image, including: defining nodes in VRML (Virtual Reality Modeling Language), the nodes being used to express multiple effects; inputting VRML files corresponding to the defined nodes, the VRML files having information on the 3-dimensional image and the multiple effects to be expressed in the 3-dimensional image; generating the 3-dimensional image by using the input VRML files; and expressing the multiple effects in the generated 3-dimensional image by using the information on the multiple effects in the input VRML files.

The multiple effects may include at least one of: a multiple texture effect for synthesizing and expressing multiple textures in the 3-dimensional image; a bump mapping effect for expressing intaglio and cameo in the 3-dimensional image; and an EMBM (Environment Mapped Bump Mapping) effect for reflecting an environment image and expressing the intaglio and cameo in the 3-dimensional image.

In addition, the expressing of the multiple effects may include: generating a resultant image by expressing one of the multiple effects in the generated 3-dimensional image; generating a source image by expressing one of the multiple effects in the generated 3-dimensional and synthesizing the source image to the resultant image; and repeating synthesizing of the source image to the resultant image until all the multiple effects are expressed in the 3-dimensional image.

In addition, the effects may be expressed in the 3-dimensional image by partitioning the generated 3-dimensional object into triangles and using operations at vertex and pixel levels of the triangles.

In addition, the bump mapping effect may be expressed in the 3-dimensional image by: generating new normal vectors with respect to the vertexes of the triangles; performing a lighting operation based on the newly-generated normal vector; and expressing a texture in the lighting-operation-performed 3-dimensional image.

In addition, the EMBM effect may be expressed in the 3-dimensional image by: generating new normal vectors with respect to the vertexes of the triangles; generating reflection vectors with respect to the pixels by using the newly-generated normal vectors; generating a texture with respect to the environment image of the 3-dimensional space by using the generated refection image and the environment image of the 3-dimensional space; and expressing the generated texture in the 3-dimensional image.

In addition, the node for expressing the multiple effects may include at least one of: a srcBlending field designating a value multiplied to the source image at a time of synthesizing the source image to the resultant image; a dstBlending field designating a value multiplied to the resultant image at the time of synthesizing the source image to the resultant image; a blendingOp field designating operations between the resultant and source images; an alphaOp field designating an operation for testing transparency of the source image; and an alphaRef field designating a reference value for testing transparency of the source image.

In addition, the synthesizing of the source image to the resultant image may include generating a synthesized resultant image by performing a predetermined operation designated in the blendingOp field with respect to a result obtained by multiplying the value designated in srcBlending field to the source image and a result obtained by multiplying the value designated in the dstBlending field to the resultant image.

In addition, the synthesizing of the source image to the resultant image may include: performing a transparency test on the source image by comparing the transparency of the source image with the reference value designated in the alphaRef field by using the designated operation designated in the alphaOp operation; and if the source image passes the transparency test, generating a synthesized resultant image by performing a predetermined operation designated in the blendingOp field with respect to a result obtained by multiplying the value designated in the srcBlending field to the source image and a result obtained by multiplying the value designated in the blendingOp field to the resultant image.

According to another aspect of the present invention, there is provided a method of expressing effects in a 3-dimensional image, including: defining nodes in VRML (Virtual Reality Modeling Language), the nodes being used to express multiple effects by synthesizing multiple textures to the 3-dimensional image; inputting VRML files corresponding to the defined nodes, the VRML files having information on the 3-dimensional image and the multiple textures; generating the 3-dimensional image by using the input VRML files; and synthesizing and expressing the multiple textures in the 3-dimensional image by using the information on the multiple textures in the input VRML files.

The multiple textures may include at least one of: a MipMap texture for expressing a texture having a size proportional to a size of the 3-dimensional image in the screen space; and a cubeEnvironment texture for reflecting environment images of the 3-dimensional space on the 3-dimensional object.

In addition, the texture may be expressed in the 3-dimensional image by partitioning the generated 3-dimensional object into triangles and using an operation at pixel levels of the triangles.

In addition, the expressing and synthesizing of the multiple texture may include: generating a resultant image by expressing one of the multiple textures in the generated 3-dimensional image; generating a texture image by expressing one of the multiple textures in the generated 3-dimensional image and synthesizing the texture image to the resultant image; and repeating the synthesizing of the texture image to the resultant image until all the multiple textures are expressed in the 3-dimensional image.

In addition, the node for expressing the multiple texture effect may include at least one of: a tfactorColor field designating a basic color; a tfactorAlpha field designating a basic transparency value; a colorStages field designating an operation used to blend colors of the resultant and texture images; a alphaStages field designating an operation used to determine transparency of the resultant image; a textureIndices field designating the multiple textures to be expressed in the 3-dimensional image; a texGeneration field designating coordinate values of the multiple textures; and a texTransformIndices field designating transform information on the multiple textures.

In addition, the synthesizing of the texture image to the resultant image may include: determining a color of the synthesized resultant image by performing the operation designated in colorStages field by using at least one of the color of the resultant image, the color of the texture image, and the basic color designated in the tfactorColor field; and determining transparency of the synthesized resultant image by performing the operation designated in the alphaStages field by using at least one of the transparency of the resultant image, the transparency of the texture mage, and the basic transparency designated in the tfactorAlpha field.

According to still another aspect of the present invention, there is provided a method of synthesizing and expressing multiple textures in a 3-dimensional image, including: generating a resultant image by expressing one of the multiple textures in the 3-dimensional image; generating a texture image expressing one of the multiple textures in the 3-dimensional image, determining a color of the resultant image by performing a first operation with at least one of a color of the resultant image, a color of the texture image, and a basic color, determining transparency of the resultant image by performing a second operation with transparency of the resultant image, transparency of the texture image, and a predetermined basic transparency, thereby synthesizing the texture image to the resultant image; and repeating the synthesizing of the texture image to the resultant image until all the multiple textures are expressed in the 3-dimensional image.

According to still another aspect of the present invention, there is provided a method of generating VRML nodes to express effects in a 3-dimensional image, including: generating srcBlending and dstBlending fields for designating values multiplied to first and second images, respectively, to synthesize the effect-expressed first and second images; and generating a blendingOp field designating operations between the first and second images.

The method may further include generating at least one of: an alphaOp field designating an operation for testing transparency of the second image; and an alphaRef field designating a reference value for testing transparency of the second image.

According to still another aspect of the present invention, there is provided a method of generating VRML nodes to express effects in a 3-dimensional image, including: generating a textureIndices field designating multiple textures to be synthesized and expressed in the 3-dimensional image; and generating a colorStages field designating operations used to blend colors of images in which the multiple textures are expressed.

The method may further include generating at least one of: a tfactorColor field designating a basic color; a tfactorAlpha field designating a basic transparency value; a alphaStages field designating an operation used to determine transparency of the resultant image to which the multiple textures are synthesized; a texGeneration field designating coordinate values of the multiple textures; and a texTransformIndices field designating transform information on the multiple textures.

According to still another aspect of the present invention, there is provided a computer-readable medium having embodied thereon a computer program for the aforementioned method of expressing effects in the 3-dimensional image and the aforementioned method of generating VRML nodes. In addition, the generated nodes and fields may be stored in the computer-readable medium.

According to still another aspect of the present invention, there is provided an apparatus for expressing effects in a 3-dimensional image, including: a memory storing information on nodes defined in VRML (Virtual Reality Modeling Language) to express multiple effects in the 3-dimensional image; a file input unit inputting VRML files having information on the multiple effects to be expressed in the 3-dimensional image; a file analysis unit analyzing the input VRML files by using node information stored in the memory to output the information on the multiple effects; and a multiple effect synthesis unit expressing the multiple effect in the 3-dimensional image by using the information on the analyzed multiple effects.

The multiple effects may include at least one of: a multiple texture effect for synthesizing and expressing multiple textures in the 3-dimensional image; a bump mapping effect for expressing intaglio and cameo in the 3-dimensional image; and an EMBM (Environment Mapped Bump Mapping) effect for reflecting an environment image and expressing the intaglio and cameo in the 3-dimensional image.

In addition, the multiple effect synthesis unit may include: an effect processor expressing the multiple effects in the 3-dimensional image to generate a source image; a source image buffer storing the source image received from the effect processor; a resultant image buffer storing a resultant image obtained by expressing the effects in the 3-dimensional image; and an image synthesis unit synthesizing the resultant image stored in the resultant image buffer and the source image stored in the source image buffer.

In addition, the effect processor may include: a vertex processor partitioning the 3-dimensional object into triangles and performing a predetermined operation at vertex levels of the triangles by using the effect to be expressed; and a pixel processor performing a predetermined operation at pixel levels of the triangles by using the effect to be expressed.

In addition, the node for expressing the multiple effects may include at least one of: a srcBlending field designating a value multiplied to the source image at a time of synthesizing the source image to the resultant image; a dstBlending field designating a value multiplied to the resultant image at the time of synthesizing the source image to the resultant image; a blendingOp field designating operations between the resultant and source images; an alphaOp field designating an operation for testing transparency of the source image; and an alphaRef field designating a reference value for testing transparency of the source image.

In addition, the image synthesis unit may generate a synthesized resultant image by performing a predetermined operation designated in the blendingOp field with respect to a result obtained by multiplying the value designated in srcBlending field to the source image and a result obtained by multiplying the value designated in the dstBlending field to the resultant image.

In addition, the apparatus may further comprise a test unit performing a transparency test on the source image by comparing the transparency of the source image with the reference value designated in the alphaRef field by using the designated operation designated in the alphaOp operation and generating and outputting a signal for operating the image synthesis unit if the source image passes the transparency test.

According to still another aspect of the present invention, there is provided an apparatus for expressing effects in a 3-dimensional image, including: a memory storing information on nodes defined in VRML (Virtual Reality Modeling Language) to express multiple textures in the 3-dimensional image; a file input unit inputting VRML files having information on the multiple textures to be expressed in the 3-dimensional image; a file analysis unit analyzing the input VRML files by using node information stored in the memory to output the information on the multiple effects; and a multiple effect synthesis unit synthesizing the multiple textures to the 3-dimensional image by using the information on the analyzed multiple effects.

The multiple textures may include at least one of: a MipMap texture for expressing a texture having a size proportional to a size of the 3-dimensional image in the screen space; and a cubeEnvironment texture for reflecting environment images of the 3-dimensional space on the 3-dimensional object.

In addition, the multiple texture synthesis unit may include: a texture expressing unit expressing the multiple texture in the 3-dimensional image; a texture image buffer storing the texture images input from the texture expression unit; a result image buffer storing a resultant image obtained by expressing the effects in the 3-dimensional image; and an image synthesis unit synthesizing the texture image stored in the texture image buffer to the resultant image stored in the result image buffer.

In addition, the texture expression unit may partition the 3-dimensional object into triangles and perform a predetermined operation at pixel levels of the triangles by using the textures to be expressed.

In addition, the node for the multiple effects may include at least one of: a tfactorColor field designating a basic color; a tfactorAlpha field designating a basic transparency value; a colorStages field designating an operation used to blend colors of images in which the multiple textures are expressed; a alphaStages field designating an operation used to determine transparency of a resultant image in which the multiple textures are synthesized; a textureIndices field designating the multiple textures to be expressed in the 3-dimensional image; a texGeneration field designating coordinate values of the multiple textures; and a texTransformIndices field designating transform information on the multiple textures.

In addition, the image synthesis unit may include: a color operation unit calculating a color of the synthesized resultant image by performing the operation designated in colorStages field by using at least one of the color of the resultant image, the color of the texture image, and the basic color designated in the tfactorColor field; and a transparency operation unit calculating transparency of the synthesized resultant image by performing the operation designated in the alphaStages field by using at least one of the transparency of the resultant image, the transparency of the texture mage, and the basic transparency designated in the tfactorAlpha field.

Additional and/or other aspects and advantages of the present invention will be set forth in part in the description which follows and, in part, will be obvious from the description, or may be learned by practice of the invention

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF EMBODIMENTS

Figure 1:
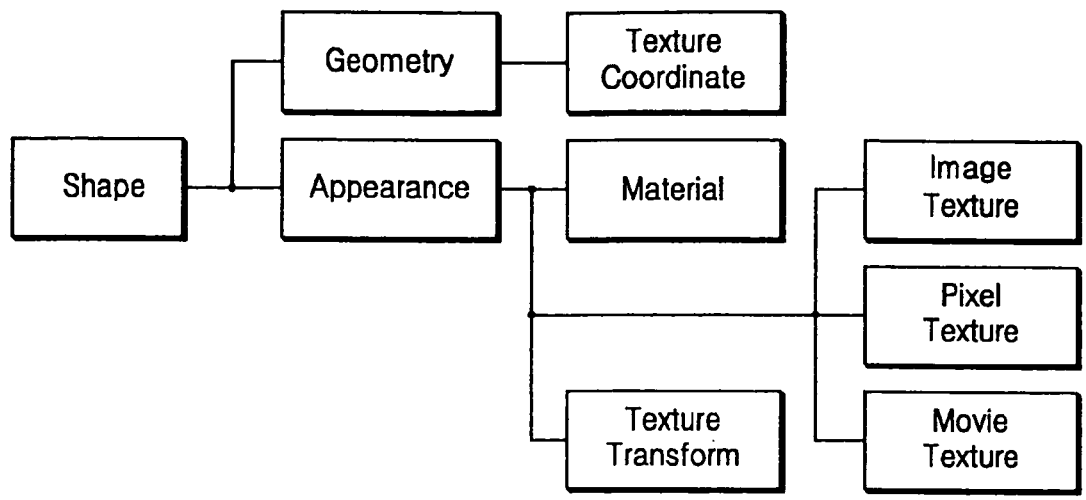
FIG. 1 shows a structure of nodes defined in accordance with a virtual reality modeling language (VRML) standard.

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 2:
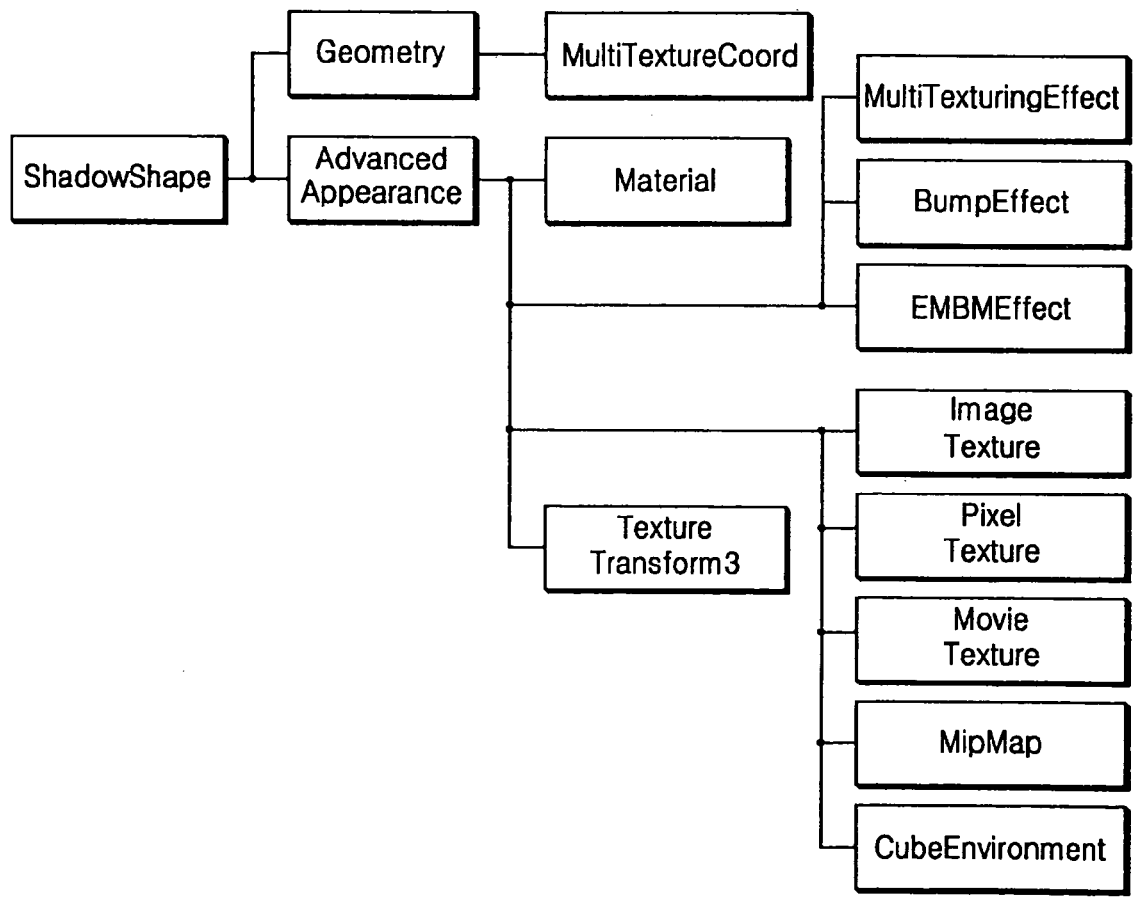
FIG. 2 shows a structure of VRML nodes according to an embodiment of the present invention.

FIG. 2 shows a structure of VRML nodes according to an embodiment of the present invention. The following description focuses on differences from the aforementioned structure of the nodes defined in accordance with the virtual reality modeling language (VRML) standard shown in FIG. 1.

A ShadowShape node is a root node including AdvancedAppearance and Geometry nodes which are newly defined to express multiple effects and textures. The ShadowShape node supports a shadow effect.

Fields for expressing the shadow effect at the ShadowShape node are defined as follows.

```
ShadowShape
{
    # Designating Occluder
    exposedField SFNode appearance NULL
    exposedField SFNode geometry   NULL
    # Designating lightsource
    field SFNode light NULL
    # Designating ShadowAttribute
    field SFColor shadowColor 0 0 0
    field SFFloat softness 0
    field SFInt32 quality 1
    field SFBool selfShadowing FALSE
    field SFFloat extrusionLength 10
}
```

Figure 4A:
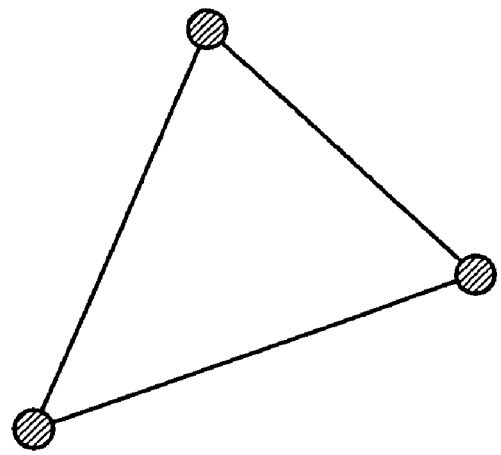
FIG. 4A is a view for explaining an example of operations of a vertex processor of FIG. 3.

By using the defined fields, an occluder, that is, an object generating a shadow and a light source affecting the shadow can be designated. In addition, attributes of the shadow can be designated. FIG. 4A shows an example of a 3-dimensional image expressing the shadow effect.

The AdvancedAppearance node is defined in accordance with the VRML standard as follows.

```
AdvancedAppearance
{
    exposedField SFNode material NULL
    exposedField MFNode effects NULL
    exposedField MFNode textures NULL
    exposedField MFNode textureTransforms      NULL
    field SFNode lightmapParams NULL
}
```

The AdvancedAppearance node includes newly defined nodes: a MipMap node for a MipMap texture effect and a CubeEnvironment node for a CubeEnvironment texture effect in addition to existing ImageTexture, PixelTexture, and MovieTexture nodes. The five nodes for five texture expressions are designated with texture fields included in the AdvancedAppearance node.

The AdvancedAppearance node includes a TextureTransform3 node obtained by adding a cameraMultiplied field to an existing TextureTransform node. The TextureTransform3 node is designated with a textureTransform field included in the AdvancedAppearance node.

The AdvancedAppearance nodes are nodes for expressing multiple effects in the 3-dimensional image. The AdvancedAppearance nodes includes: a MultiTexturingEffect node for simultaneously expressing multiple textures in the 3-dimensional image; a BumpEffect node for expressing a bump mapping effect, that is, an intaglio cameo effect in the 3-dimensional image; and an EMBMEffect node for reflecting environment images and expressing the intaglio and cameo in the 3-dimensional image. The nodes for the three effect expressions are designated with effect fields included in the AdvancedAppearance node.

A lightmapParams field newly added in the AdvancedAppearance node is a field designating usage of Lightmap.

The newly added nodes, fields, and effect expression methods using the nodes and fields will be described in detail later.

Figure 3:
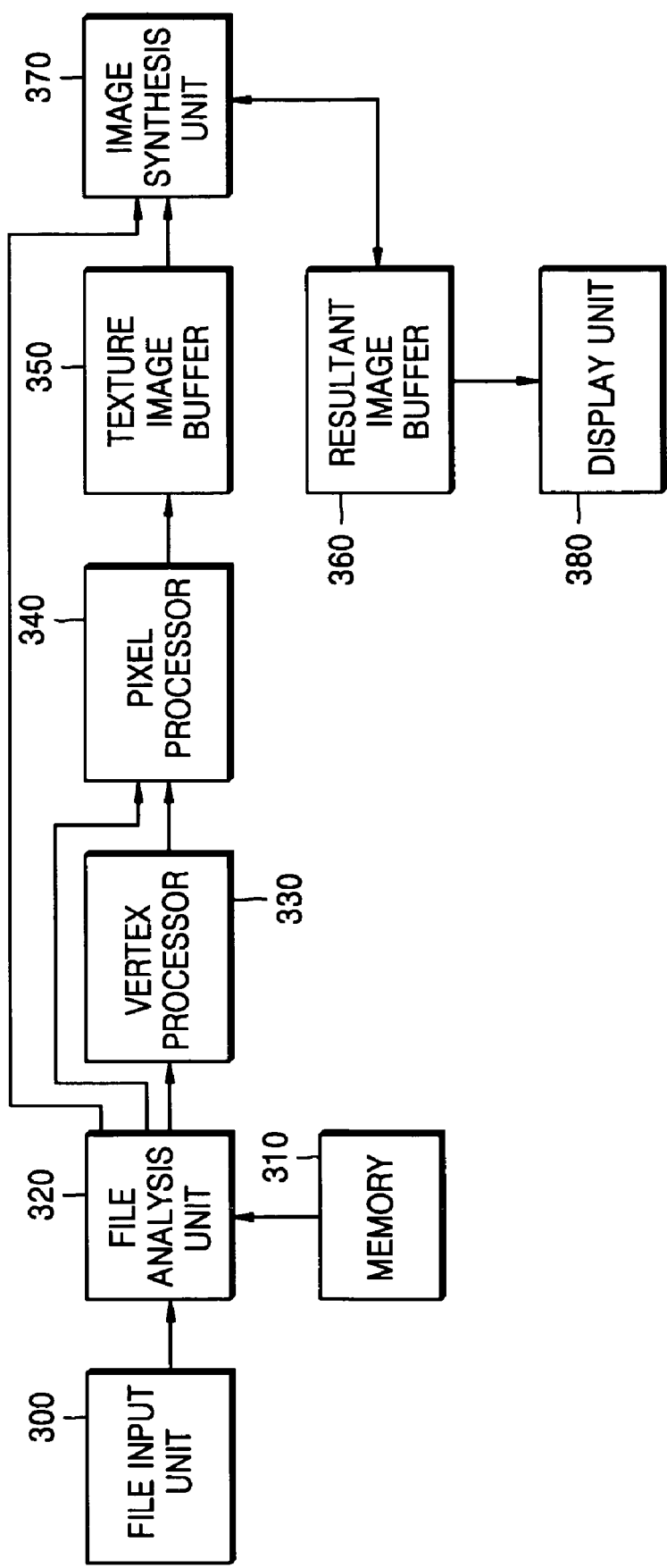
FIG. 3 is a block diagram of a construction of an apparatus for expressing multiple textures in a 3-dimensional image according to an embodiment of the present invention.

FIG. 3 is a block diagram of a construction of an apparatus for expressing multiple textures in a 3-dimensional image according to an embodiment of the present invention. The apparatus includes a file input unit 300, a memory 310, a file analysis unit 320, a vertex processor 330, a pixel processor 340, a texture image buffer 350, a resultant image buffer 360, an image synthesis unit 370, and a display unit 380.

The operation of the multiple texture expression apparatus shown in FIG. 3 will be described with reference to a flowchart of a method of expressing multiple textures in a 3-dimensional image according to an embodiment of the present invention shown in FIG. 10.

Figure 10:
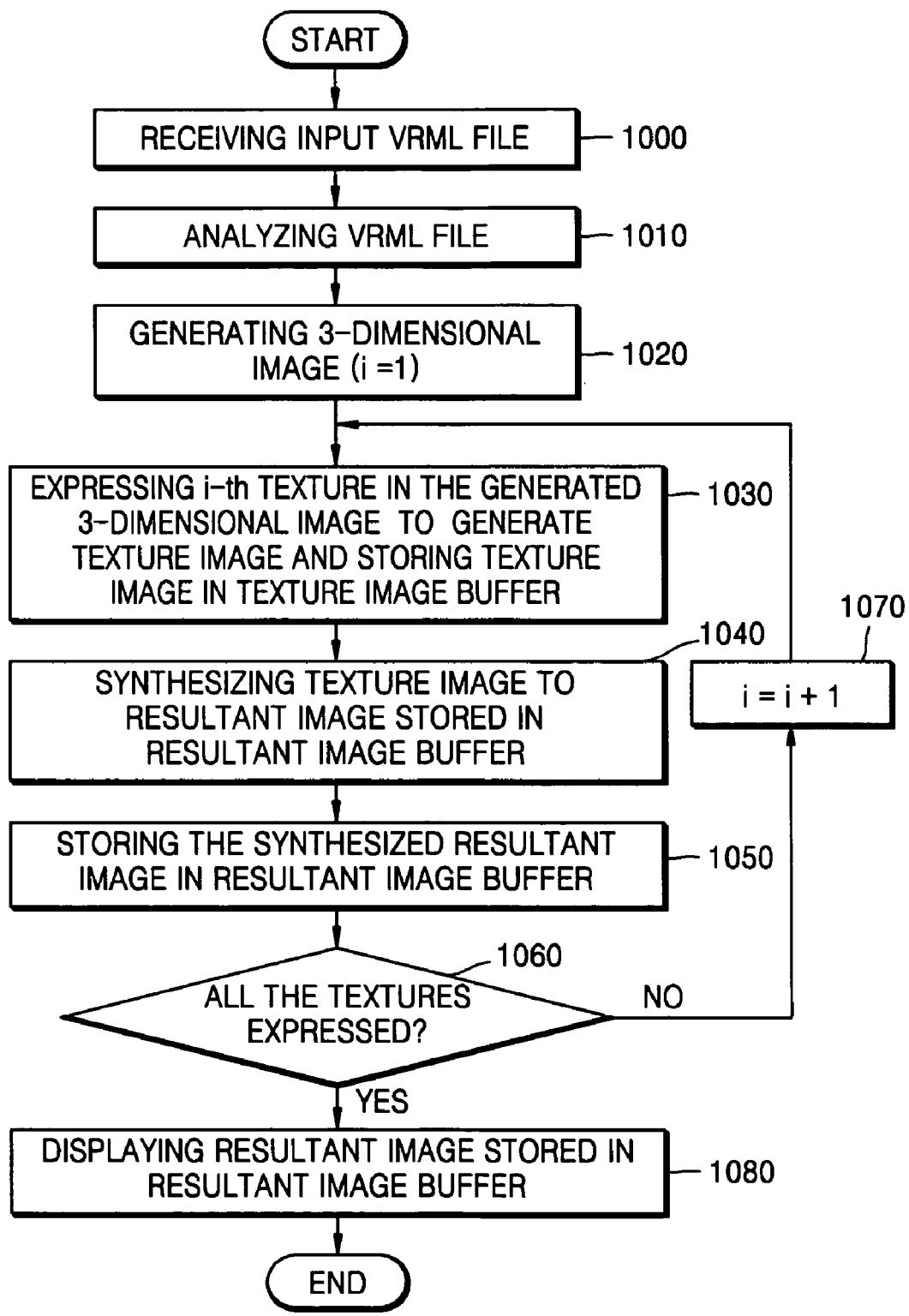
FIG. 10 is a flowchart of a method of expressing multiple textures in a 3-dimensional image according to an embodiment of the present invention.

Referring to FIGS. 3 and 10, the file input unit 300 receives input VRML files expressing a 3-dimensional image to be generated based on the nodes shown in FIG. 2 and the fields included in the nodes (operation 1000).

The file analysis unit 320 analyzes the input VRML files by using information on the node and fields stored in the memory 310 (operation 1010).

The 3-dimensional image to be expressed is partitioned into a plurality of triangles. The vertex processor 330 calculates image data about vertexes of the triangles. The pixel processor 340 calculates data about pixels of the triangles to generate the 3-dimensional image (operation 1020).

FIG. 4A is a view for explaining an example of operations of the vertex processor 330. Referring to FIGS. 3 and 4A, the vertex processor 330 calculates rotation and movement of the three vertexes of the triangle shown in the figure and performs a lighting vector element process operation. The vertex processor 330 may use a vertex shader for hardware acceleration.

Figure 4B:
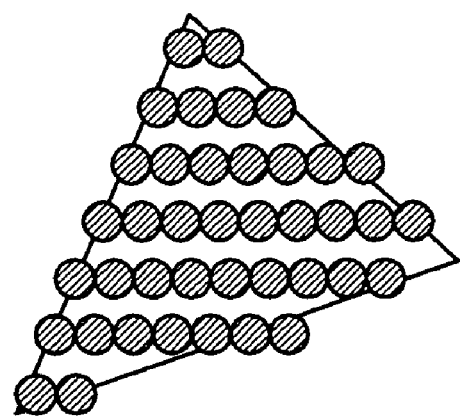
FIG. 4B is a view for explaining an example of operations of a pixel processor of FIG. 3.

FIG. 4B is a view for explaining an example of operations of the pixel processor 340. Referring to FIGS. 3 and 4B, the pixel processor 340 calculates camera reflection vectors of the pixels within the triangle shown in the figure and performs a Dp3 (Dot product 3D) operation. The pixel processor 340 may use a pixel shader for hardware acceleration.

Referring again to FIGS. 3 and 10, the vertex and pixel processors 330 and 340 perform vertex and pixel process operations for the vertexes and pixels of the partitioned triangles by using an analysis result about the generated 3-dimensional image and the first texture of the multiple to-be-expressed textures to generate a texture image, that is, the 3-dimensional image with the first texture expressed therein. The pixel processor 340 stores the generated texture image in the texture image buffer 350 (operation 1030).

The image synthesis unit 370 synthesizes the resultant image stored in the resultant image buffer 360 with the texture image stored in the texture image buffer 350 (operation 1040). The synthesized resultant image is stored in the resultant image buffer 360 (operation 1050).

The file analysis unit 320 checks whether or not all the multiple to-be-expressed textures are expressed in the resultant image (operation 1060). Until the all the multiple to-be-expressed textures are expressed, the operations 1030 to 1050 are repeatedly performed on the textures (operation 1070). When the operations 1040 and 1050 are performed on the first texture, there is no resultant image in the resultant image buffer 360, so that the texture image generated in the operation 1030 may be stored in the resultant image buffer 360 as it is.

If all the multiple to-be-expressed textures are expressed in the resultant image, the display unit 380 outputs the resultant image (stored in the resultant image buffer 360) on a screen (operation 1080).

Figure 5:
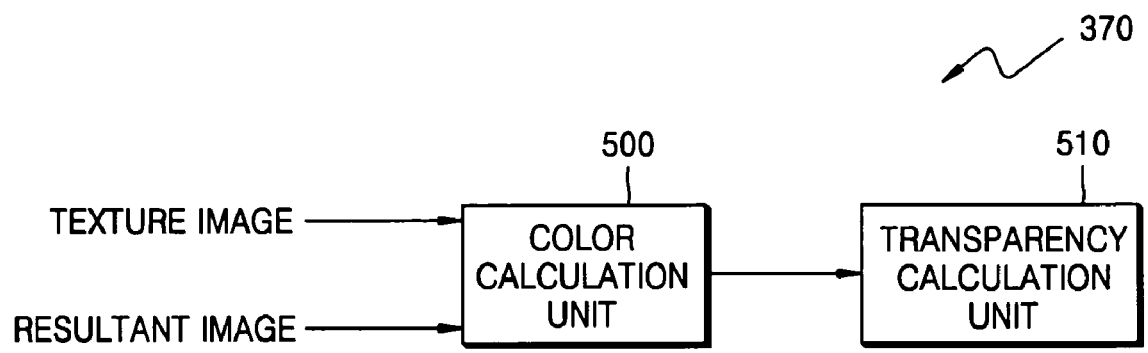
FIG. 5 is a block diagram showing an example of an image synthesizer of FIG. 3.

FIG. 5 is a block diagram showing an example of the image synthesis unit 370 of FIG. 3. The image synthesis unit 370 includes a color operation unit 500 and a transparency operation unit 510.

A MultiTexturingEffec node defined to express multiple textures in a 3-dimensional image includes tfactorColor, tfactorAlpha, colorStages, alphaStages, textureIndices, texGeneration, and texTransformIndices fields. The tfactorColor, and tfactorAlpha fields designate basic colors and basic transparency used for synthesis. The colorStages field designates a synthesis procedure for the multiple textures and a color blending operation for the texture-expressed image.

Figure 6:
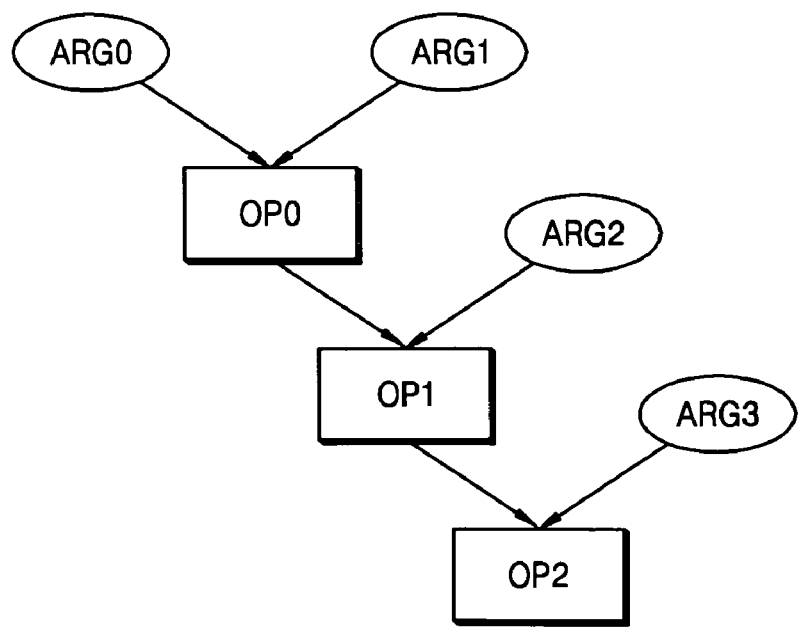
FIG. 6 is a view for explaining a colorStages field included in a multitexturing node of FIG. 2.

FIG. 6 is a view for explaining the ColorStages field included in the multitexturing node of FIG. 2. The colorStages field is defined to determine color of a synthesized image as follows.

colorStages ["ARG0", "OP0", "ARG1", "OP1", "ARG2", "OP2"]

In the colorStages field, OP0, OP1, and OP2 are operations performed to determine colors of the synthesized image, and ARG0, ARG1, and ARG2 designate the colors to be calculated. The to-be-calculated colors can be designated with one of DIFFUSE (a constant indicating a diffuse color) SPECULAR (a constant indicating a specular color), TEXTURE (a constant indicating a color of texture), and TFACTOR (a constant indicating a basic color designated in the tfactorcolor field).

The diffuse color is a whole color of the 3-dimensional image in consideration of light. The diffuse color is associated with an expression of surfaces of an object on which diffused reflection of light having different dispersions with respect to angles of surfaces occurs. The specular color is associated with an expression of surfaces of the object on which total refection of light having different dispersions with respect to the angles of the surfaces and a direction of camera occurs.

In the colorStages field, the operation used to determine colors includes SELECTARG1 operation for selecting a designated-before-operation color of two colors, SELECTARG2 operation for selecting a designated-after-operation color of two colors, MODULATE operation for multiplying the two designated colors, and ADD operation for adding the two designated colors.

Similar to the colorStages field, the alphaStages field designates sequentially designates operations for determining the transparency of the synthesized image and constants to be calculated. The textureIndices field sequentially designates the multiple textures to be expressed in a 3-dimensional image. The textureIndices field designates only the indices of the multiple textures. The filenames of the really-expressed textures or storage locations thereof are designated by using the texture field in the AdvancedAppearance node.

The texGeneration field sequentially designates coordinates of the multiple textures to be expressed in the 3-dimensional image. The texGeneration field designates only the coordinates of the multiple textures. The coordinates of the really-expressed textures are designated in the Geometry node.

The texTransformIndices field sequentially designates transform information on the multiple textures to be expressed in the 3-dimensional image. The texTransformIndices field designates only the indices of the transform information of the multiple textures. The coordinates of the really-expressed textures are designated by using the texture-Transforms fields in the AdvancedAppearance.

Referring to FIGS. 5 and 6, the color operation unit 500 receives the texture image and the resultant image and determines color of the synthesized image based on the color determination information designated in the colorStages field. The transparency operation unit 510 determinates the transparency of the synthesized image based on the transparency determination information designated in the alphaStages field.

An example of a VRML files written to synthesize multiple texture in a 3-dimensional image is as follows.

```
Shape {
    geometry Box {
    }
    appearance AdvancedAppearance {
        material Material {
            diffuseColor 1 0.6 1
            specularColor 0.7 0.4 0
        }
        textures [
            ImageTexture { url "tex0.bmp" }
            ImageTexture { url "tex1.bmp" }
        ]
        effects MultiTexturingEffect {
            colorStages
            ["DIFFUSE" "MODULATE" "TEXTURE"
            "BLENDCURRENTALPHA" "TEXTU
            RE"]
            alphaStages [ "TFACTOR" "SELECTARG1"
            "TEXTURE" ]
            textureIndices [0,1]
            texGeneration [ "CH0" "CH0" ]
            texTransformIndices [ –1 0 ]
            tfactorAlpha 0.6
        }
    }
}
```

Now, a method of generating a 3-dimensional image in which the multiple textures are expressed in accordance with the VRML file will be described. In the Geometry field, an appearance of the 3-dimensional image is designated as a cube. In a Material node, diffuse and specular colors are designated by using the diffuseColor and specularColor fields, respectively. The multiple textures to be expressed in the 3-dimensional image are stored in two files tex0.bmp and tex1.bmp and designated by using the texture fields.

The textureIndices field designates the indices of the designated textures. The colors of the 3-dimensional image in which the two textures are expressed are determined in accordance with the sequence designated in the colorStages field, as follows. The diffuse color and the color of the tex0.bmp image designated as the first texture are multiplied, and a BLENDCURRENTALPAHA operation is performed on the result of the multiplication operation and the color of the tex1.bmp designated as the second texture, thereby determining the colors f the 3-dimensional image. The BLENDCURRENTALPAHA operation is an operation of blending the two colors by using the designated transparency of the image.

In the alphaStages field, the TFACTOR, that is, basic transparency of a 3-dimensional image is designated. Therefore, the colors of the two-texture-expressed 3-dimensional image are determined by using Equation 1.

$$color=(diffusecolor*tex0color)*(basic\ transparency)+tex1color*(1-(basic\ transparency)) \quad [Equation\ 1]$$

The tex0color is a color of the texture image stored in the tex0.bmp file, and the tex1color is a color of the texture image stored in the tex1.bmp. The basic transparency has a value of 0.8 designated in the tfactorAlpha field.

Figure 7A:
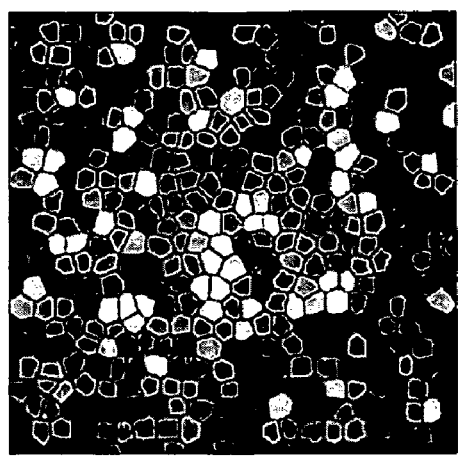
FIG. 7A shows a first example of a texture expressed in a 3-dimensional image.
Figure 7B:
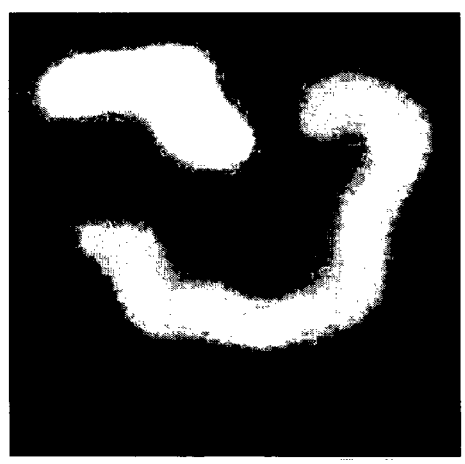
FIG. 7B shows a second example of a texture expressed in a 3-dimensional image.
Figure 7C:
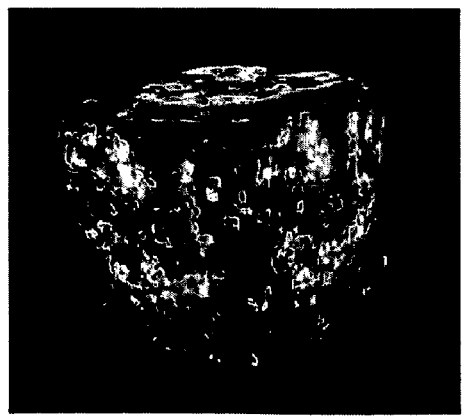
FIG. 7C shows a 3-dimensional image obtained by synthesizing the textures of FIGS. 7A and 7B.

FIG. 7A shows a first example of a texture expressed in a 3-dimensional image. FIG. 7B shows a second example of a texture expressed in a 3-dimensional image. FIG. 7C shows a 3-dimensional image obtained by synthesizing the textures of FIGS. 7A and 7B.

Now, a MipMap texture effect expressed in the 3-dimensional image will be described. The MipMap texture effect is a texture effect for expressing the texture in the 3-dimensional image to match the size of texture-expressed 3-dimensional image region with the size of display screen. MipMap nodes and level fields for the MipMap texture effect are defined as follows.

```
MipMap
{
    exposedField    MFNode    levels []
}
```

The texture matching with size level of the region may be designated manually by a user or automatically. An example of VRML file expressing the MipMap texture effect is as follows.

```
Shape {
    geometry Box {size 3 3 3
    }
    appearance Appearance {
        material Material {
        }
        texture MipMap {
            levels [
                ImageTexture { url "128.jpg" }
                ImageTexture { url "64.jpg" }
                ImageTexture { url "32.jpg" }
                ImageTexture { url "16.jpg" }
            ]
        }
    }
}
```

Figure 8:
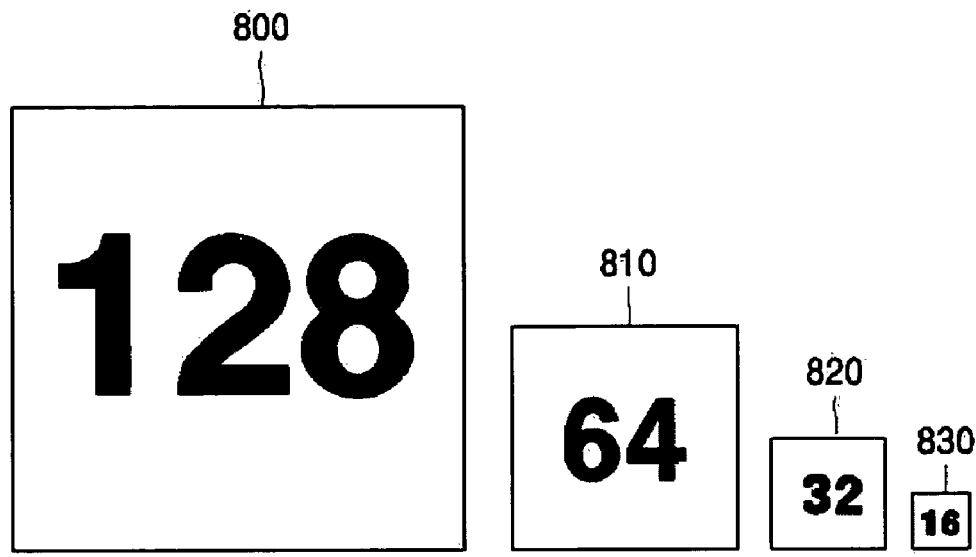
FIG. 8 shows an example of a method of expressing a MipMap texture in a 3-dimensional image.

FIG. 8 shows an example of a method of expressing the MipMap texture effect in the 3-dimensional image. According to the MipMap texture effect, the textures are expressed in accordance with the size levels 800, 810, 820, and 830 of the texture-expressed 3-dimensional image regions.

Now, a CubeEnvironment texture effect expressed in the 3-dimensional image will be described. The CubeEnvironment texture effect is a texture effect for designating textures on surfaces of the 3-dimensional image and reflecting the 3-dimensional-image environment image on the textures. The CubeEnvironment nodes and level fields for the CubeEnvironment texture effect are defined as follows.

```
CubeEnvironment
{
    exposedField SFNode backTexture       NULL
    exposedField SFNode bottomTexture     NULL
    exposedField SFNode frontTexture      NULL
    exposedField SFNode leftTexture       NULL
    exposedField SFNode rightTexture      NULL
    exposedField SFNode topTexture        NULL
}
```

An example of VRML file expressing the CubeEnvironment texture effect is as follows.

```
Shape {
    geometry Sphere {}
    appearance AdvancedAppearance {
        textures CubeEnvironment {
            backTexture ImageTexture { url "uffizi_negz.png" }
            bottomTexture ImageTexture { url "uffizi_posy.png" }
            frontTexture ImageTexture { url "uffizi_posz.png" }
            leftTexture ImageTexture { url "uffizi_negx.png" }
            rightTexture ImageTexture { url "uffizi_posx.png" }
            topTexture ImageTexture { url "uffizi_negy.png" }
        }
        texture Transforms Texture Transform3 {
            cameraMultiplied TRUE
        }
        effects MultiTextureEffect
        {
            colorStages [ "DIFFUSE" "MODULATE" "TEXTURE" ]
            texGeneration [ "CAMREFL" ]
            texTransformIn dices [ 0 ]
        }
    }
}
```

The textureTransforms field is a field designating a TextureTransform3 node. The TextureTransform3 node includes a cameraMultiplied field in addition to an existing TextureTransform node. The cameraMultiplied field must be designated as TRUE in order to use environment mapping such as the CubeEnvironment texture effect.

The TextureTransform3 node is defined as follows.

```
TextureTransform3
{
    exposedField    SFVec3f    center          0 0 0      #(-inf, inf)
    exposedField    SFRotation rotation        0 0 1 0    # [-1 1],(-inf, inf)
    exposedField    SFVec3f    scale           1 1 1      # (0, inf)
    exposedField    SFRotation scaleOrientation            0 0 1 0 # [-1 1],(-inf, inf)
    exposedField    SFVec3f    translation     0 0 0      # (-inf, inf)
    field   SFBool  cameraMultiplied  FALSE
}
```

Figure 9:
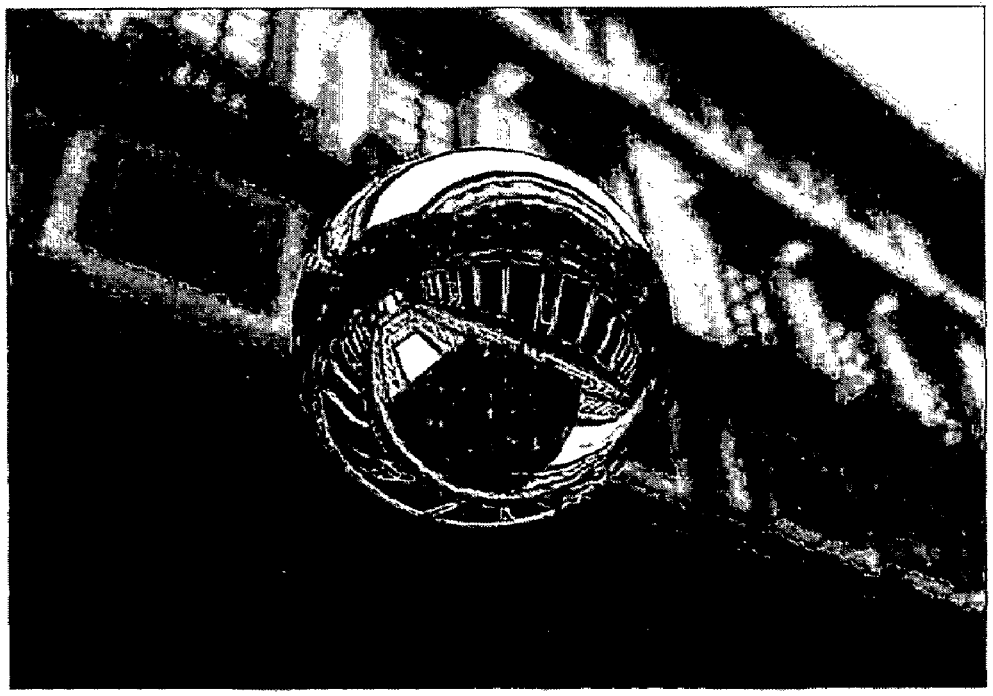
FIG. 9 shows an embodiment of a method of expressing a CubeEnvironment texture in a 3-dimensional image.

FIG. 9 shows an example of a method of expressing the CubeEnvironment texture in the 3-dimensional image.

The Geometry node may include MultiTextureCoord nodes, which are new nodes capable of designating a plurality of the existing TextureCoordinates in accordance with a multiple texture expression in order to designate u and v coordinates of various textures.

The MultiTextureCoord node is defined as follows.

```
MultiTextureCoord
{
    exposedField    MFNode    texCoords    NULL
}
```

Figure 11:
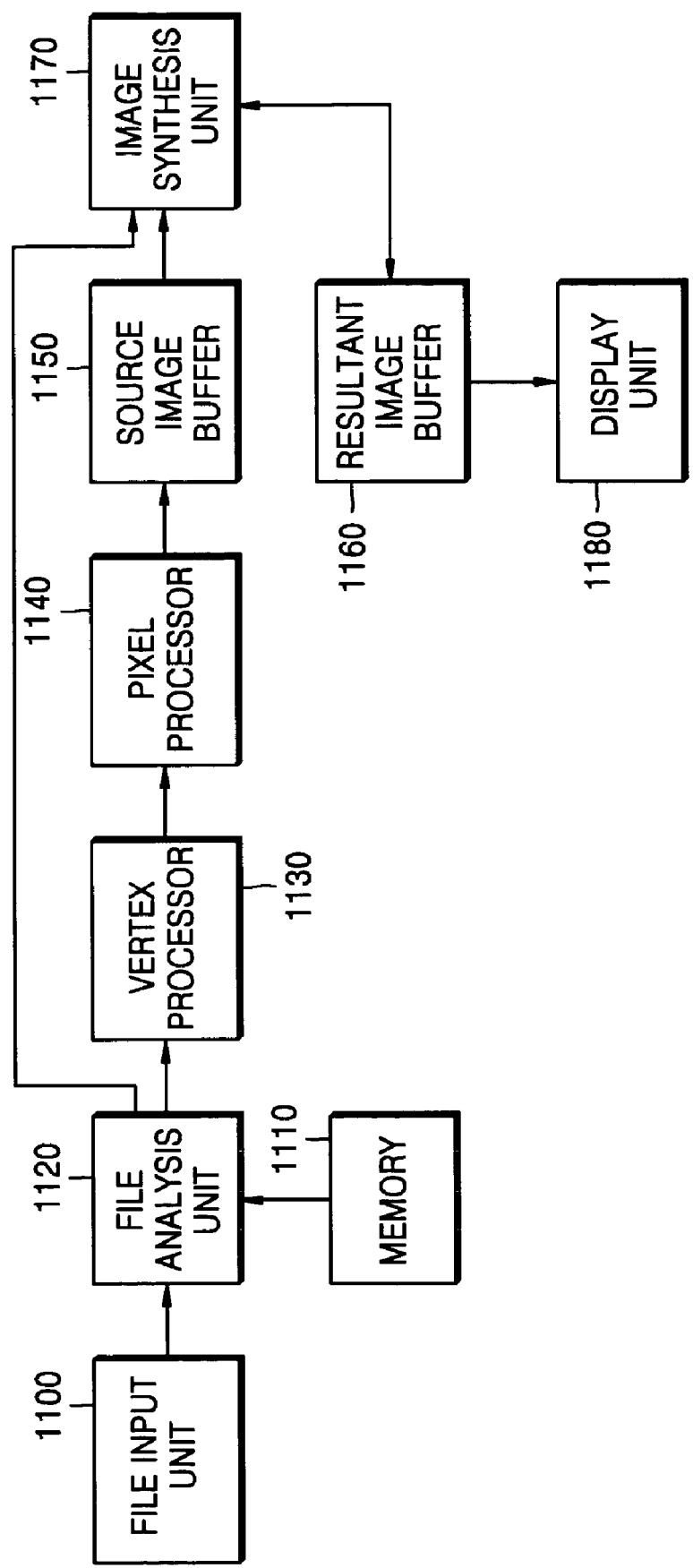
FIG. 11 is a block diagram of an apparatus for expressing multiple effects in a 3-dimensional image according to an embodiment of the present invention.

FIG. 11 is a block diagram of an apparatus for expressing multiple effects in a 3-dimensional image according to an embodiment of the present invention. The apparatus includes a file input unit 1100, a memory 1110, a file analysis unit 1120, a vertex processor 1130, a pixel processor 1140, a source image buffer 1150, a resultant image buffer 1160, an image synthesis unit 1170, and a display unit 1180.

The operation of the multiple texture expression apparatus shown in FIG. 11 will be described with reference to a flowchart of a method of expressing multiple textures in a 3-dimensional image according to an embodiment of the present invention shown in FIG. 12.

Figure 12:
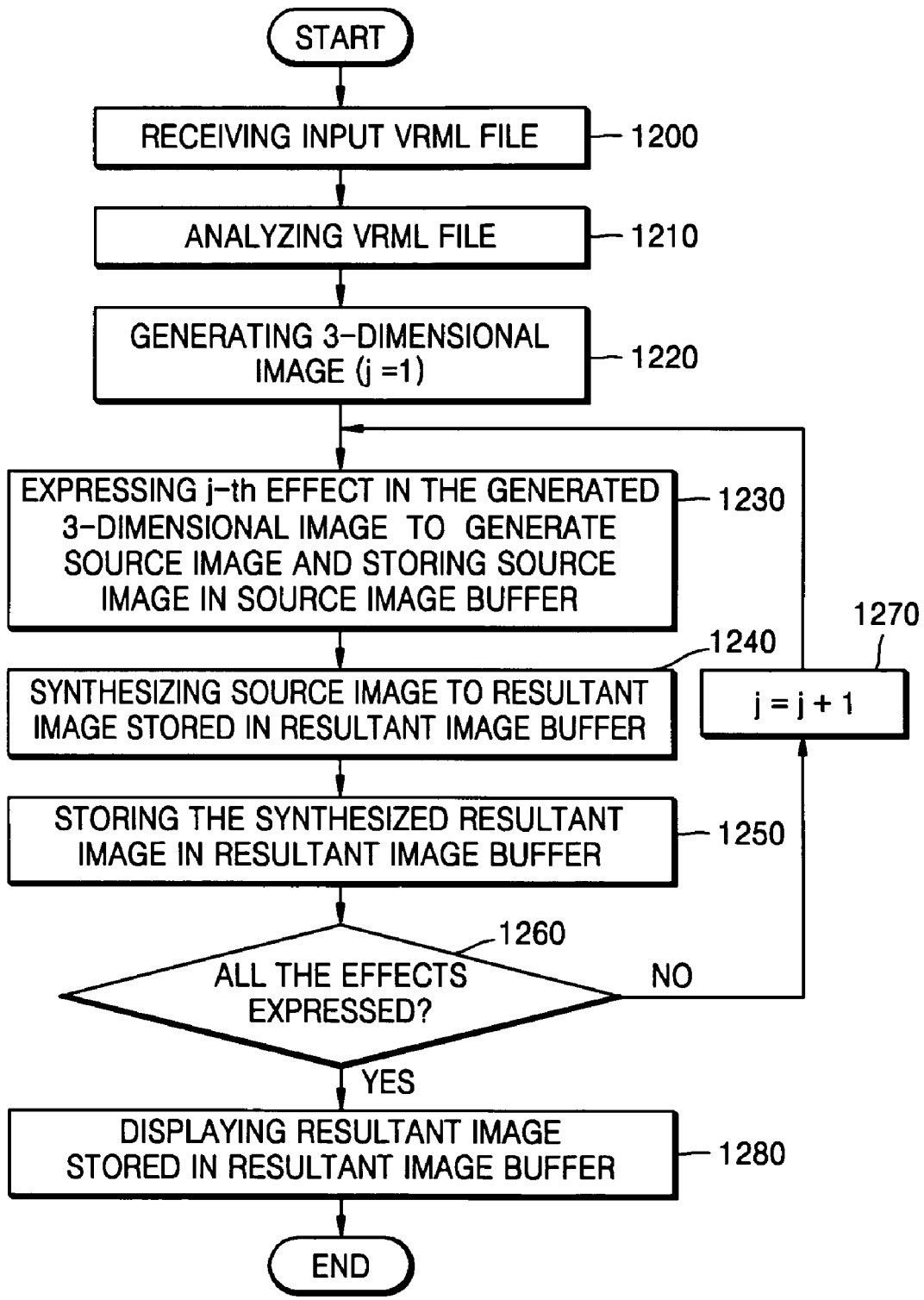
FIG. 12 is a flowchart of a method of expressing multiple effects in a 3-dimensional image according to an embodiment of the present invention.

Referring to FIGS. 11 and 12, the multiple effects may include the aforementioned multiple texture expression effect, a bump mapping effect for expressing intaglio and cameo in the 3-dimensional image, and an environment mapped bump mapping effect for expressing intaglio and cameo such as bump mapping as well as reflecting an environment image in the 3-dimensional image.

The file input unit 1100 receives input VRML files expressing a 3-dimensional image to be generated based on the nodes shown in FIG. 2 and the fields included in the nodes (operation 1200).

The file analysis unit 1120 analyzes the input VRML files by using information on the node and fields stored in the memory 1110 (operation 1210).

The 3-dimensional object to be expressed is partitioned in to a plurality of triangles. The vertex processor 1130 calculates image data about vertexes of the triangles. The pixel processor 1140 calculates data about pixels of the triangles to generate the 3-dimensional image (operation 1220).

The vertex and pixel processors 1130 and 1140 express the first effect (of the multiple effects to be expressed in the generated 3-dimensional image) for the vertexes and pixels of the partitioned triangles to generate a source image and stores the source image in the source image buffer 1150 (operation 1230).

The image synthesis unit 1170 synthesizes the resultant image stored in the resultant image buffer 1160 with the source image stored in the source image buffer 1150 (operation 1240). The synthesized resultant image is stored in the resultant image buffer 1160 (operation 1250).

The file analysis unit 1120 checks whether or not all the multiple to-be-expressed effects are expressed in the resultant image (operation 1260). Until the all the multiple to-be-expressed effects are expressed, the operations 1230 to 1250 are repeatedly performed on the textures (operation 1270). When the operations 1240 and 1250 are performed on the first effect, there is no resultant image stored in the resultant image buffer 1160, so that the source image generated in the operation 1230 may be stored in the resultant image buffer 1160 as it is.

If all the multiple to-be-expressed effects are expressed in the resultant image, the display unit 1180 outputs the resultant image (stored in the resultant image buffer 1160) on a screen (operation 1280).

Fields commonly included in the node for expressing the multiple effects are defined as follows. A method of synthesizing the resultant image and the source image will be described with reference to the following fields.

```
exposedField SFString    srcBlending   ""   #ONE
exposedField SFString    blendingOp    ""   #ADD
exposedField SFString    dstBlending   ""   #ZERO
exposedField SFString    alphaOp ""         # ALWAYS
exposedField SFInt32     alphaRef 0x00 # [0x00 – 0xff]
```

The srcBlending field designates a value multiplied to the source image at the time of synthesizing the resultant image soured in the resultant image buffer 1160 and the effect-expressed source image (in which the effects of the node including the fields are expressed). The dstBlending field designates a value multiplied to the resultant image. The blendingOp field designates an operation between the resultant image and the source image. The alphaOp field designates an operation for testing transparency of the source image. The alphaRef field designates a reference value for testing the transparency of the source image.

The resultant and source images are synthesized according to the values and the operations designated by the fields.

Table 1 indicates values designated by the srcBlending and dstBlending fields.

TABLE 1

| | |
|---|---|
| ZERO | (0, 0, 0, 0) |
| ONE | (1, 1, 1, 1) |
| SRCCOLOR | $(R_s, G_s, B_s, A_s)$ |
| INVSRCCOLOR | $(1 - R_s, 1 - G_s, 1 - B_s, 1 - A_s)$ |
| SRCALPHA | $(A_s, A_s, A_s, A_s)$ |
| INVSRCALPHA | $(1 - A_s, 1 - A_s, 1 - A_s, 1 - A_s)$ |
| DESTCOLOR | $(R_d, G_d, B_d, A_d)$ |
| INVDESTCOLOR | $(1 - R_d, 1 - G_d, 1 - B_d, 1 - A_d)$ |

Table 2 indicates operations designated by the blendingOp field.

TABLE 2

| | |
|---|---|
| ADD | sourceColor *srcBlending + destinationColor * dstBlending |
| SUB | sourceColor * srcBlending – destinationColor * dstBlending |
| REVSUB | destinationColor * dstBlending – sourceColor * srcBlending |
| MIN | MIN(sourceColor, destinationColor) |
| MAX | MAX(sourceColor, destinationColor) |

In Table 2, the sourceColor is a color of the source image generated in the current effect node. The destinationColor is a color of the resultant image generated in the synthesis operation of the nodes just before the current effect node.

Figure 13:
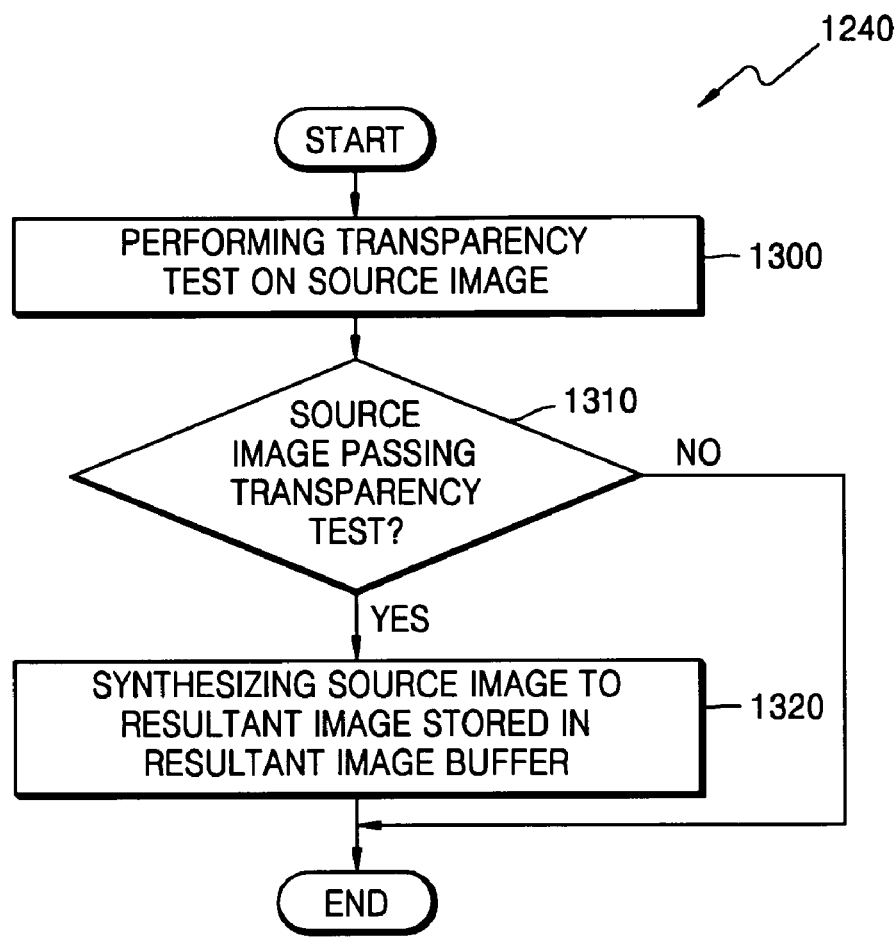
FIG. 13 is a flowchart of an example of an operation of synthesizing a source image and a resultant image of FIG. 12.

FIG. 13 is a flowchart of an example of an operation of synthesizing the source image and the resultant image of FIG. 12. Referring to FIGS. 12 and 13, the image synthesis unit 1170 performs the transparency test (alpha test) for the source image by using the operation and reference value designated by the alphaOp and alphaRef fields (operation 1300). For example, in a case where the operation designated by the alphaOp field is inequality (<) and the reference value of the transparency designated by the alphaRef field is 0.6, if the transparency of the source image is smaller than 0.6, it can be determined that the source image passes the transparency test.

The image synthesis unit 1170 determines whether or not the source image passes the transparency test (operation 1310). Only if the transparency test passes are the resultant and source images synthesized by the aforementioned method (operation 1320). If the source image does not pass the transparency test, the image synthesis unit 1170 does not synthesize the resultant and source images.

A method of designating effects by using effect fields is as follows.

```
AdvancedAppearance
{
    ...
    effects [
        MultiTextureEffect {...}
        BumpEffect {...}
        MultiTextureEffect {...}
    ]
    ...
}
```

Like this, after the multiple effects to be expressed in the 3-dimensional image are designated by using the effect fields, the designated effects are synthesized to the 3-dimensional image.

A first example of the VRML file written to express the multiple effects in the 3-dimensional image is as follows.

```
Shape {
    appearance AdvancedAppearance {
        material Material {...}
        textures [    ImageTexture { url "tex0.bmp" } ImageTexture {
                      url "tex1.bmp" }
                      ImageTexture { url "tex2.bmp" } ImageTexture {
                      url "tex3.bmp" } ]
        effects [ MultiTextureEffect {
                      srcBlending "ONE"
                      dstBlending "ZERO"
                      blendingOp "ADD"
                      colorStages [ "DIFFUSE" "MODULATE"
                      "TEXTURE" "MODULATE" "TEXTURE" ]
                      alphaStages [ "TFACTOR" "SELECTARG1"
                      "TEXTURE" ]
                      textureIndices [0, 1]
                      texGeneration [ "CH0" "CH0" ]
                      texTransformIndices [ –1 –1 ]
                      tfactorAlpha 0.5
                  }
                  MultiTextureEffect {
                      srcBlending "SRCALPHA"
                      dstBlending "INVSRCALPHA"
                      blendingOp "ADD"
                      colorStages [ "DIFFUSE" "MODULATE"
                      "TEXTURE" "MODULATE" "TEXTURE" ]
                      alphaStages [ "TFACTOR" "SELECTARG1"
                      "TEXTURE" ]
                      textureIndices [2, 3]
                      texGeneration [ "CH0" "CH0" ]
                      texTransformIndices [ –1 –1 ]
                      tfactorAlpha 0.7
                  }
        ]
    }
    geometry Box {
    }
}
```

In the VRML file, two multiple texture expression effects are synthesized in the 3-dimensional image. The synthesis result of the resultant image is represented by using Equation 2.

$$\text{color} = (\text{sourceColor} * \text{SRCARLPHA}) + (\text{destinationColor} * \text{NVSRCALPHA}) \quad \text{[Equation 2]}$$

Equation 2 is applied to the second MultitextureEffect node. The sourceColor is a color of the 3-dimensional image generated by the colorStages in the second MultitextureEffect node. The destinationColor is a color of the 3-dimensional image determined in the just-before MultitextureEffect node. The SRCALPHA is a value determined by the alphaStages in the second MultitextureEffect. In the first embodiment, the tfactorAlpha value is 0.7. The INVSRCALPHA is 1-SRCALPHA. In the first embodiment, the INVSRCALPHA is 0.3 (=1-0.7).

A second example of the VRML file written to express the multiple effects in the 3-dimensional image is as follows.

```
Shape {
    appearance AdvancedAppearance {
        material Material {...}
        textures [    ImageTexture { url "tex0.bmp" } ImageTexture {
                      url "tex1.bmp" }
                      ImageTexture { url "tex2.bmp" } ImageTexture {
                      url "tex3.bmp" } ]
        effects [ MultiTextureEffect {
                      srcBlending "ONE"
                      dstBlending "ZERO"
                      blendingOp "ADD"
                      colorStages [ "DIFFUSE" "MODULATE"
                      "TEXTURE" "MODULATE" "TEXTURE" ]
                      alphaStages [ "TFACTOR" "SELECTARG1"
                      "TEXTURE" ]
                      textureIndices [0, 1]
                      texGeneration [ "CH0" "CH0" ]
                      texTransformIndices [ -1 -1 ]
                      tfactorAlpha 0.5
                  }
                  MultiTextureEffect {
                      srcBlending "DESTCOLOR"
                      dstBlending "ZERO"
                      blendingOp "ADD"
                      colorStages [ "DIFFUSE" "MODULATE"
                      "TEXTURE" "MODULATE" "TEXTURE" ]
                      alphaStages [ "TFACTOR" "SELECTARG1"
                      "TEXTURE" ]
                      textureIndices [2, 3]
                      texGeneration [ "CH0" "CH0" ]
                      texTransformIndices [ -1 -1 ]
                      tfactorAlpha 0.7
                  }
        ]
    }
    geometry Box {
    }
}
```

In the VRML file, two multiple texture expression effects are synthesized in the 3-dimensional image. The synthesis result of the resultant image is represented by using Equation 3.

$$\text{color} = (\text{sourceColor} * \text{DESTCOLOR}) + (\text{destinationColor} * \text{ZERO}) \quad \text{[Equation 3]}$$

A third example of the VRML file written to express the multiple effects in the 3-dimensional image is as follows.

```
Shape {
    appearance AdvancedAppearance {
        material Material {...}
        textures [    ImageTexture { url "tex0.bmp" } ImageTexture {
                      url "tex1.bmp" }
                      ImageTexture { url "tex2.bmp" } ImageTexture {
                      url "tex3.bmp" } ]
        effects [ MultiTextureEffect {
                      srcBlending "ONE"
                      dstBlending "ZERO"
                      blendingOp "ADD"
                      colorStages [ "DIFFUSE" "MODULATE"
                      "TEXTURE" "MODULATE" "TEXTURE" ]
```

-continued

```
                      alphaStages [ "TFACTOR" "SELECTARG1"
                      "TEXTURE" ]
                      textureIndices [0, 1]
                      texGeneration [ "CH0" "CH0" ]
                      texTransformIndices [ -1 -1 ]
                      tfactorAlpha 0.5
                  }
                  MultiTextureEffect {
                      srcBlending "ONE"
                      dstBlending "ONE"
                      blendingOp "ADD"
                      colorStages [ "DIFFUSE" "MODULATE"
                      "TEXTURE" "MODULATE" "TEXTURE" ]
                      alphaStages [ "TFACTOR" "SELECTARG1"
                      "TEXTURE" ]
                      textureIndices [2, 3]
                      texGeneration [ "CH0" "CH0" ]
                      texTransformIndices [ -1 -1 ]
                      tfactorAlpha 0.7
                  }
        ]
    }
    geometry Box {
    }
}
```

In the VRML file, two multiple texture expression effects are synthesized in the 3-dimensional image. The synthesis result of the resultant image is represented by using Equation 4.

$$\text{color} = (\text{sourceColor} * \text{ONE}) + (\text{destinationColor} * \text{ONE}) \quad \text{[Equation 4]}$$

Figure 14:
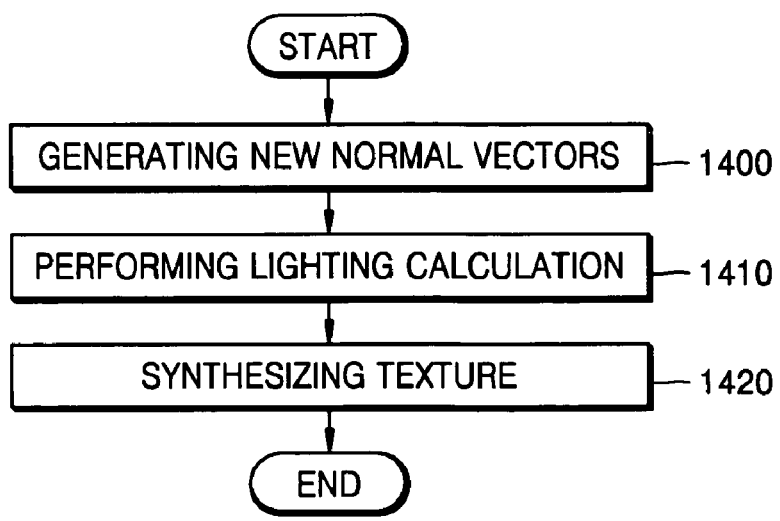
FIG. 14 is a flowchart of an example of a method of expressing a Bump mapping effect in a 3-dimensional image.

Now, a method of expressing a bump mapping effect for intaglio and cameo in a 3-dimensional image will be described with reference to a flowchart of FIG. 14.

In order to express the intaglio and cameo in the 3-dimensional image, a new normal vector (S&T vector) for each of vertexes of triangles in the 3-dimensional object is generated (operation 1400). If there is no specific designation, the normal vectors may be automatically generated. The normal vectors may be extracted from an input normal image having information on the normal vectors.

A lighting process is performed at the triangle pixel levels of the 3-dimensional object according to the generated normal vectors (operation 1410).

A texture designated with a base image is synthesized to the lighting-processed 3-dimensional image (operation 1420).

A node for the bump mapping effect is defined as follows.

```
BumpEffect
{
    exposedField    SFString    srcBlending         ""
    exposedField    SFString    dstBlending         ""
    exposedField    SFString    alphaOp             ""
    exposedField    SFInt32     alphaRef            0x00    # [0x00 – 0xff]
    exposedField    SFInt32     normalTextureIndex  0       # [0 – 7]
    exposedField    SFInt32     normalTexCoordIndex 0       # [0 – 7]
    exposedField    SFInt32     baseTextureIndex    -1      # [-1 – 7]
    exposedField    SFInt32     baseTexCoordIndex   0       # [0 – 7]
}
stvector
{
    exposedField    MFVec3f     svector             []
    exposedField    MFVec3f     tvector             []
}
```

The normalTextureIndex field designates indices of the normal vectors used as references for generating the normal vectors at the time of the bump mapping. The normalTexCoordIndex designates indices of coordinates of the normal image. The baseTextureIndex designates indices of the base image expressed in appearance of the 3-dimensional image at the time of the bump mapping. The baseTexCoordIndex designates indices of coordinates of the base image.

An example of the VRML file written to express the bump mapping effect in the 3-dimensional image is as follows.

```
Shape {
    appearance AdvancedAppearance {
        material Material {
            diffuseColor 0. 9 0. 9 0. 9
            specularColor 0. 1 0. 0 0. 1
        }
        textures [
            ImageTexture {
                url "bump.png"
            }
            ImageTexture {
                url "texblend1.png"
            }
        ]
        effects BumpEffect {
            baseTextureIndex 1
            normalTextureIndex 0
        }
    }
    geometry Box {
    }
}
```

Figure 15A:
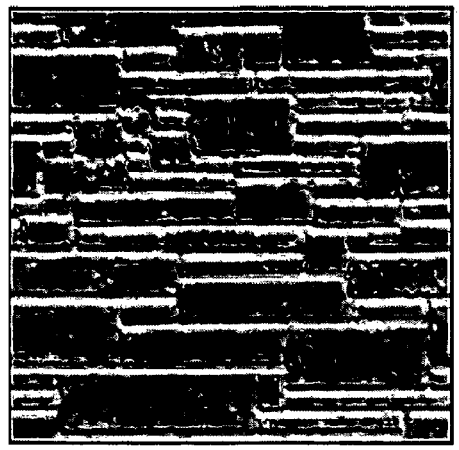
FIG. 15A is an example of a normal image used for a Bump mapping effect expression.
Figure 15B:
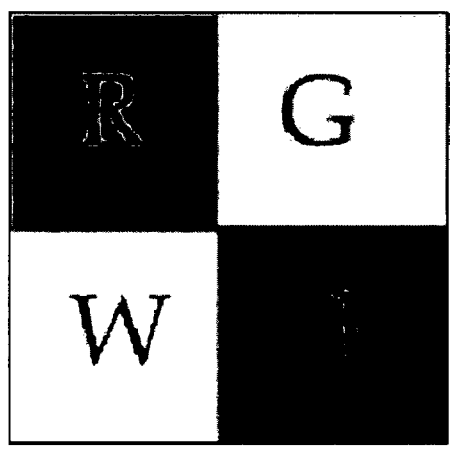
FIG. 15B is an example of a base image used for a Bump mapping effect expression.

FIG. 15A is an example of a normal image used for a Bump mapping effect expression. FIG. 15B is an example of a base image used for a Bump mapping effect expression.

Figure 15C:
FIG. 15C shows a 3-dimensional image expressing a Bump mapping effect by using the normal and base images of FIGS. 15A and 15B.

FIG. 15C shows a 3-dimensional image expressing a Bump mapping effect by using the normal and base images of FIGS. 15A and 15B.

Figure 16:
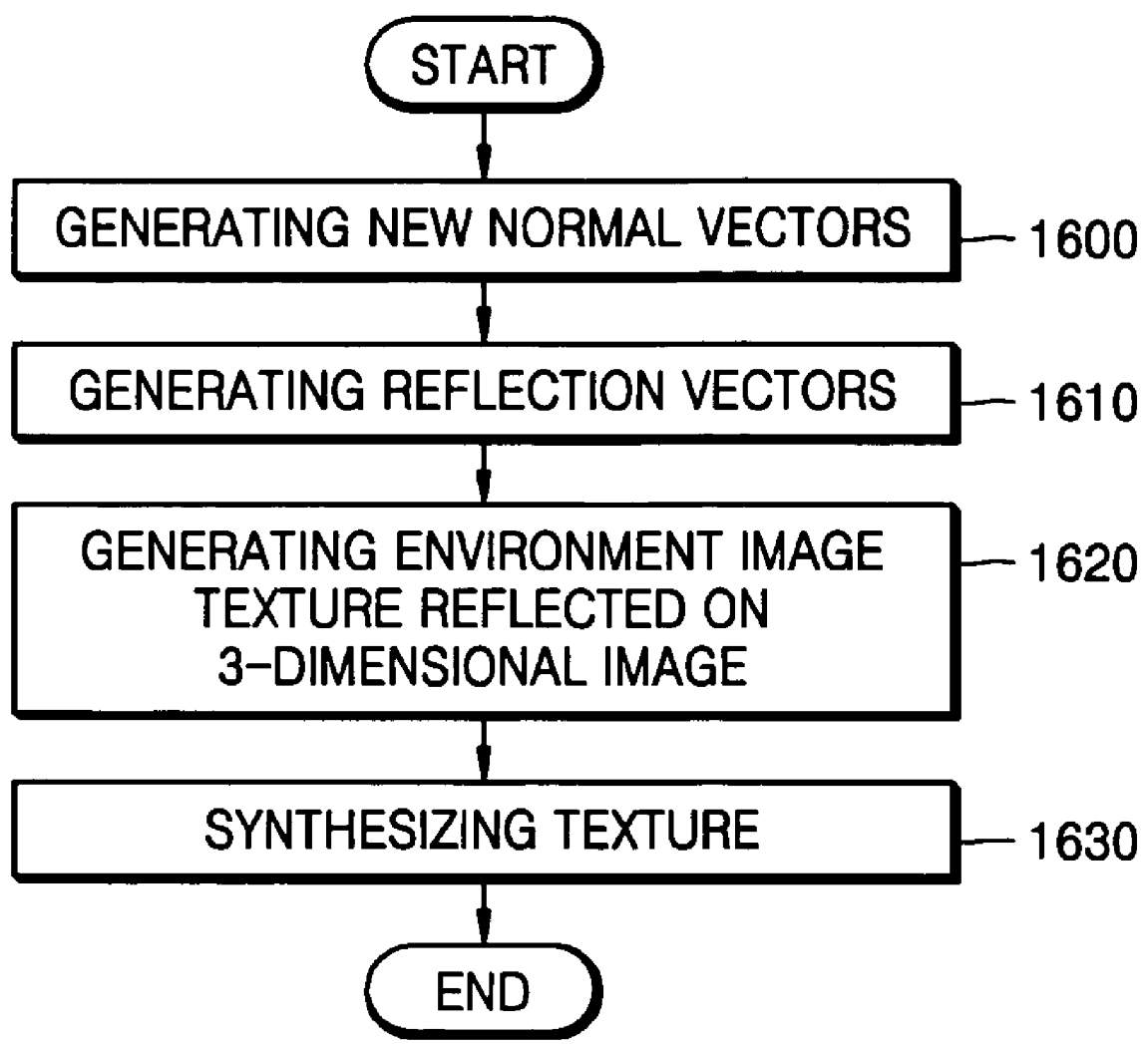
FIG. 16 is a flowchart of an example of a method of expressing an environment mapped bump mapping (EMBM) effect in a 3-dimensional image.

Now, an EMBM effect for reflecting environment image and expressing the intaglio and cameQ in the 3-dimensional image will be described with reference to a flowchart of FIG. 16.

In order to express the EMBM effect in the 3-dimensional image, a new normal vector (S&T vector) for each of vertexes of triangles in the 3-dimensional image is generated (operation 1600).

A reflection vector is generated at the triangle pixel levels of the 3-dimensional object according to the generated normal vectors (operation 1610). The environment image texture to be reflected on the 3-dimensional image is generated (operation 1620). The generated environment image texture is synthesized to the 3-dimensional image (operation 1630).

A node for the EMBM effect is defined as follows.

The envTextureIndex field designates indices of textures reflecting the environment image of the 3-dimensional space.

Figure 17:
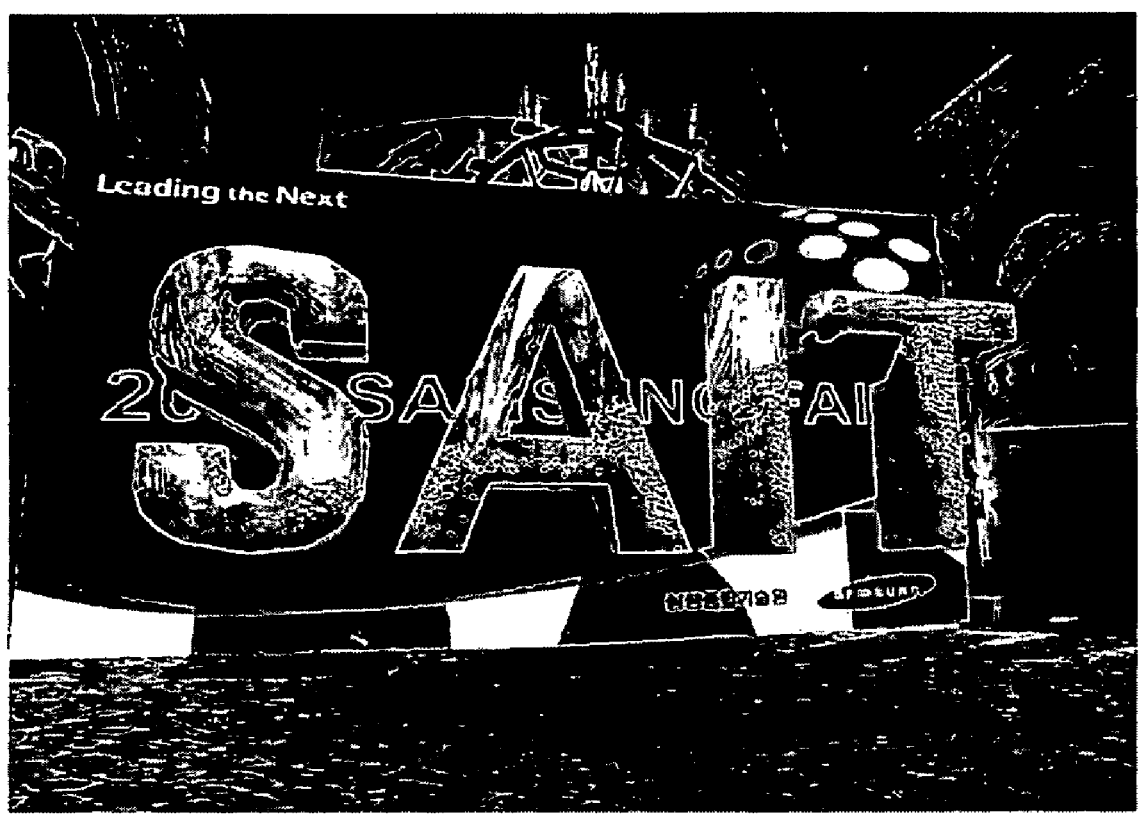
FIG. 17 shows an example of a 3-dimensional image expressing an EMBM effect.

FIG. 17 shows an example of the 3-dimensional image expressing the EMBM effect.

According to a 3-dimensional image multiple effect expression method and apparatus of the above-described embodiments of the present invention, VRML nodes and fields are defined to synthesize multiple effects and multiple textures in the 3-dimensional image, so that it is possible to effectively apply the multiple effects and multiple texture effects in the 3-dimensional image in cooperation with a conventional 3-dimensional image expression method and apparatus. Accordingly, it is possible to apply the multiple effects or the multiple texture effects in the 3-dimensional image by a user simply designating the multiple effects or the multiple texture effects.

The present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices. The computer readable recording medium can also be distributed over network coupled computer systems so that the computer readable code is stored and executed in a distributed fashion.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A method of expressing effects in a 3-dimensional image, comprising:

defining nodes in VRML (Virtual Reality Modeling Language) respectively defining effects relative to an object of the 3-dimensional image, different from other-object nodes in VRML respectively identifying effects relative to another object of the 3-dimensional image, with one or more of the defined nodes having plural fields representing different effects and the one or more defined nodes being used to express multiple effects including one or more effects expressed on the object of the 3-dimensional image and one or more effects expressed on the 3-dimensional image;

generating the 3-dimensional image using the defined nodes; and

```
BumpEffect
{
    exposedField    SFString    srcBlending     ""
    exposedField    SFString    dstBlending     ""
    exposedField    SFString    alphaOp         ""
    exposedField    SFInt32     alphaRef        0x00    # [0x00 – 0xff]
    exposedField    SFInt32     normalTextureIndex      0   # [0 – 7]
    exposedField    SFInt32     normalTexCoordIndex     0   # [0 – 7]
    exposedField    SFInt32     envTextureIndex         0   # [–1 – 7]
}
``` using at least one processing device for expressing the multiple effects in the generated 3-dimensional image using information on the multiple effects in the defined nodes.

2. The method according to claim 1, wherein the multiple effects include at least one of:
   a multiple texture effect for synthesizing and expressing multiple textures in the 3-dimensional image defined by a multiple texture effect node;
   a bump mapping effect for expressing an intaglio and a cameo in the 3-dimensional image defined by a bump mapping effect node; and
   an EMBM (Environment Mapped Bump Mapping) effect for reflecting an environment image and expressing the intaglio and cameo in the 3-dimensional image defined by an EMBM node.

3. The method according to claim 2, wherein the effects are expressed in the 3-dimensional image by partitioning the generated 3-dimensional object into triangles and using operations at vertex and pixel levels of the triangles, and
   wherein the bump mapping effect is expressed in the 3-dimensional image by:
   generating new normal vectors with respect to the vertexes of the triangles;
   performing a lighting operation based on the newly-generated normal vectors; and
   expressing a texture in the 3-dimensional image after the performing a lighting operation.

4. The method according to claim 2, wherein the effects are expressed in the 3-dimensional image by partitioning the generated 3-dimensional object into triangles and using operations at vertex and pixel levels of the triangles, and
   wherein the EMBM effect is expressed in the 3-dimensional image by:
   generating new normal vectors with respect to the vertexes of the triangles;
   generating reflection vectors with respect to the pixels using the newly-generated normal vectors;
   generating a texture with respect to the environment image of the 3-dimensional space using the generated refection image and the environment image of the 3-dimensional space; and
   expressing the generated texture in the 3-dimensional image.

5. The method according to claim 1, wherein the expressing the multiple effects comprises:
   generating a resultant image by expressing one of the multiple effects in the 3-dimensional image;
   generating a source image by expressing one of the multiple effects in the 3-dimensional image and synthesizing the source image into the resultant image; and
   repeatedly synthesizing the source image into the resultant image until all the multiple effects are expressed in the 3-dimensional image.

6. The method according to claim 5, wherein one or more of the defined nodes for expressing the multiple effects includes at least one of:
   a srcBlending field designating a value multiplied to the source image at a time of synthesizing the source image to the resultant image;
   a dstBlending field designating a value multiplied to the resultant image at the time of synthesizing the source image to the resultant image;
   a blendingOp field designating operations between the resultant and source images;
   an alphaOp field designating an operation for testing transparency of the source image; and
   an alphaRef field designating a reference value for testing transparency of the source image.

7. The method according to claim 6, wherein the synthesizing of the source image into the resultant image comprises generating a synthesized resultant image by performing a predetermined operation designated in the blendingOp field with respect to a result obtained by multiplying the value designated in the srcBlending field to the source image and a result obtained by multiplying the value designated in the dstBlending field to the resultant image.

8. The method according to claim 6, wherein the synthesizing of the source image to the resultant image comprises:
   performing a transparency test on the source image by comparing the transparency of the source image with the reference value designated in the alphaRef field using the designated operation designated in the alphaOp operation; and
   generating a synthesized resultant image by performing a predetermined operation designated in the blendingOp field with respect to a result obtained by multiplying the value designated in the srcBlending field to the source image and a result obtained by multiplying the value designated in the blendingOp field to the resultant image, when the source image passes the transparency test.

9. A computer-readable medium having embodied thereon a computer program for the method of claim 1.

10. The method according to claim 1, wherein the effects are expressed in the 3-dimensional image by partitioning the generated 3-dimensional object into triangles and using operations at vertex and pixel levels of the triangles.

11. A method of expressing effects in a 3-dimensional image, comprising:
   defining nodes in VRML (Virtual Reality Modeling Language), the nodes being used to express multiple effects;
   inputting VRML files corresponding to the defined nodes, the VRML files having information on the 3-dimensional image and the multiple effects to be expressed in the 3-dimensional image;
   generating the 3-dimensional image using the input VRML files; and
   using at least one processing device for expressing the multiple effects in the generated 3-dimensional image using the information on the multiple effects in the input VRML files, wherein the effects are expressed in the 3-dimensional image by partitioning the generated 3-dimensional object into triangles and using operations at vertex and pixel levels of the triangles.

12. A method of expressing effects in a 3-dimensional image, comprising:
   defining nodes in VRML (Virtual Reality Modeling Language), respectively defining effects relative to an object of the 3-dimensional image, different from other-object nodes in VRML respectively identifying effects relative to another object of the 3-dimensional image, with one or more of the defined nodes having plural fields representing different effects and the one or more defined nodes being used to express multiple effects including one or more effects expressed on the object of the 3-dimensional image and one or more effects expressed on the 3-dimensional image;
   generating the 3-dimensional image using the defined nodes; and
   using at least one processing device for synthesizing and expressing the multiple textures in the generated 3-dimensional image using information on the multiple textures in the defined nodes.

13. The method according to claim 12, wherein the multiple textures include at least one of:
   a MipMap texture for expressing a texture having a size proportional to a size of the 3-dimensional image in the screen space defined by a MipMap texture node; and
   a cubeEnvironment texture for reflecting environment images of a 3-dimensional space on the 3-dimensional object defined by a cubeEnvironment texture node.

14. The method according to claim 12, wherein the texture is expressed in the 3-dimensional image by partitioning the generated 3-dimensional object into triangles and using an operation at pixel levels of the triangles.

15. The method according to claim 12, wherein the synthesizing and expressing of multiple texture comprises:
   generating a resultant image by expressing one of the multiple textures in the 3-dimensional image;
   generating a texture image by expressing one of the multiple textures in the 3-dimensional image and synthesizing the texture image into the resultant image; and
   repeating the synthesizing of the texture image into the resultant image until all the multiple textures are expressed in the 3-dimensional image.

16. The method according to claim 15, wherein one or more of the defined nodes for expressing the multiple texture effect includes at least one of:
   a tfactorColor field designating a basic color;
   a tfactorAlpha field designating a basic transparency value;
   a colorStages field designating an operation used to blend colors of the resultant and texture images;
   an alphaStages field designating an operation used to determine a transparency of the resultant image;
   a textureIndices field designating the multiple textures to be expressed in the 3-dimensional image;
   a texGeneration field designating coordinate values of the multiple textures; and
   a texTransformIndices field designating transform information on the multiple textures.

17. The method according to claim 16, wherein the synthesizing of the texture image into the resultant image comprises:
   determining a color of the synthesized resultant image by performing the operation designated in the colorStages field using at least one of the color of the resultant image, the color of the texture image, and the basic color designated in the tfactorColor field; and
   determining a transparency of the synthesized resultant image by performing the operation designated in the alphaStages field using at least one of the transparency of the resultant image, the transparency of the texture mage, and the basic transparency designated in the tfactorAlpha field.

18. A computer-readable medium having embodied thereon a computer program for the method of claim 12.

19. A method of synthesizing and expressing multiple textures for an object in a 3-dimensional image, comprising:
   generating a resultant image by expressing one of the multiple textures for the object in the 3-dimensional image;
   using at least one processing device for generating a texture image expressing one of the multiple textures in the 3-dimensional image, determining a color of the resultant image by performing a first operation with at least one of a color of the resultant image, a color of the texture image, and a basic color based on a color field of a node defining the multiple textures of the object different from another node defining multiple textures of another object in the 3-dimensional image, determining a transparency of the resultant image by performing a second operation with transparency of the resultant image, transparency of the texture image, and a predetermined basic transparency based on an alpha field of the node defining the multiple textures of the object, thereby synthesizing the texture image to the resultant image; and
   repeatedly synthesizing the texture image into the resultant image until all the multiple textures are expressed in the 3-dimensional image.

20. A computer-readable medium having embodied thereon a computer program for the method of claim 19.

21. A method of generating virtual reality modeling language (VRML) nodes to express effects for an object in a 3-dimensional image, the method comprising using at least one processing device for:
   generating srcBlending and dstBlending fields of a node defining the multiple textures of the object different from another node defining multiple effects of another object in the 3-dimensional image, the srcBlending and dstBlending fields designating values multiplied to first and second images, respectively, to synthesize the effect-expressed first and second images; and
   generating a blendingOp field of the node designating operations between the first and second images.

22. The method according to claim 21, further comprising generating at least one of:
   an alphaOp field of the node designating an operation for testing transparency of the second image; and
   an alphaRef field of the node designating a reference value for testing transparency of the second image.

23. A method of generating virtual reality modeling language (VRML) nodes to express effects for an object in a 3-dimensional image, the method comprising using at least one processing device for:
   generating a textureIndices field of a node defining the multiple textures of the object different from another node defining multiple effects of another object in the 3-dimensional image, the textureIndices field designating multiple textures to be synthesized and expressed for the object in the 3-dimensional image; and
   generating a colorStages field of the node designating operations used to blend colors of images in which the multiple textures are expressed.

24. The method according to claim 23, further comprising generating at least one of:
   a tfactorColor field of the node designating a basic color;
   a tfactorAlpha field of the node designating a basic transparency value;
   an alphaStages field of the node designating an operation used to determine transparency of the resultant image to which the multiple textures are synthesized;
   a texGeneration field of the node designating coordinate values of the multiple textures; and
   a texTransformIndices field of the node designating transform information on the multiple textures.

25. A computer-readable medium having embodied thereon a computer program for expressing effects in a 3-dimensional image, comprising:
   an effect node expressing multiple effects for an object in the 3-dimensional image different from another node defining multiple effects of another object in the 3-dimensional image, through use of plural fields of the effect node, in the 3-dimensional image, the effect node including at least one of:
   srcBlending and dstBlending fields for designating values multiplied to first and second images, respectively, to synthesize the effect-expressed first and second images;

a blendingOp field designating operations between the first and second images.
an alphaOp field designating an operation for testing transparency of the second image; and
an alphaRef field designating a reference value for testing the transparency of the second image.

26. A computer-readable medium having embodied thereon a computer program for expressing effects in a 3-dimensional image, comprising:
a multitexturing node synthesizing and expressing multiple textures in the 3-dimensional image different from another node defining multiple textures of another object in the 3-dimensional image, through use of plural fields of the multitexturing node, for an object in the 3-dimensional image, the multitexturing node including at least one of:
a tfactorColor field designating a basic color;
a tfactorAlpha field designating a basic transparency value;
a colorStages field designating an operation used to blend colors of images in which the multiple textures are expressed;
an alphaStages field designating an operation used to determine transparency of a resultant image in which the multiple textures are synthesized;
a textureIndices field designating the multiple textures;
a texGeneration field designating coordinate values of the multiple textures; and
a texTransformIndices field designating transform information on the multiple textures.

27. A virtual reality modeling language (VRML) node expressing multiple effects controlling operation of at least one processing device generation of an object in a 3-dimensional image different from another node defining multiple effects of another object in the 3-dimensional image, the VRML node comprising:
srcBlending and dstBlending fields designating values multiplied to first and second images, respectively, to synthesize the effect-expressed first and second images;
a blendingOp field designating operations between the first and second images;
an alphaOp field designating an operation for testing transparency of the second image; or
an alpha Ref field designating a reference value for testing the transparency of the second image.

28. A virtual reality modeling language (VRML) node expressing multiple effects controlling operation of at least one processing device generation of an object in a 3-dimensional image different from another node defining multiple effects of another object in the 3-dimensional image, the VRML node comprising:
a textureIndices field designating multiple textures to be synthesized and expressed in the 3-dimensional image;
a tfactorColor field designating a basic color;
a tfactorAlpha field designating a basic transparency value;
a colorStages field designating an operation used to blend colors of images in which the multiple textures are expressed;
an alphaStages field designating an operation used to determine transparency of a resultant image in which the multiple textures are synthesized;
a texGeneration field designating coordinate values of the multiple textures; or
a texTransformIndices field designating transform information on the multiple textures.

29. An apparatus for expressing effects in a 3-dimensional image, comprising:

a memory storing information on nodes defined in VRML (Virtual Reality Modeling Language) respectively defining effects relative to an object of the 3-dimensional image, different from other-object nodes in VRML respectively identifying effects relative to another object of the 3-dimensional image, with one or more of the defined nodes having plural fields representing different effects and the one or more defined nodes being used to express multiple effects including one or more effects expressed on the object of the 3-dimensional image and one or more effects expressed on the 3-dimensional image;
a file analysis unit analyzing the defined nodes stored in the memory to output the information on the multiple effects; and
a multiple effect synthesis unit expressing the multiple effect for a 3-dimensional object in the 3-dimensional image using the information on the analyzed defined nodes.

30. The apparatus according to claim 29, wherein the multiple effects include at least one of:
a multiple texture effect for synthesizing and expressing multiple textures in the 3-dimensional image defined by a multiple texture effect node;
a bump mapping effect for expressing an intaglio and a cameo in the 3-dimensional image defined by a bump mapping effect node; and
an EMBM (Environment Mapped Bump Mapping) effect for reflecting an environment image and expressing the intaglio and cameo in the 3-dimensional image defined by an EMBM node.

31. The apparatus according to claim 29, wherein the multiple effect synthesis unit comprises:
an effect processor expressing the multiple effects in the 3-dimensional image to generate a source image;
a source image buffer storing the source image received from the effect processor;
a resultant image buffer storing a resultant image obtained by expressing the effects in the 3-dimensional image; and
an image synthesis unit synthesizing the resultant image stored in the resultant image buffer and the source image stored in the source image buffer.

32. The apparatus according to claim 31, wherein the effect processor comprises:
a vertex processor partitioning the 3-dimensional object into triangles and performing a predetermined operation at vertex levels of the triangles using the effect to be expressed; and
a pixel processor performing a predetermined operation at pixel levels of the triangles using the effect to be expressed.

33. The apparatus according to claim 31, wherein one or more of the defined nodes for expressing the multiple effects includes at least one of:
a srcBlending field designating a value multiplied to the source image at a time of synthesizing the source image to the resultant image;
a dstBlending field designating a value multiplied to the resultant image at the time of synthesizing the source image to the resultant image;
a blendingOp field designating operations between the resultant and source images;
an alphaOp field designating an operation for testing transparency of the source image; and
an alphaRef field designating a reference value for testing the transparency of the source image.

34. The apparatus according to claim 33, wherein the image synthesis unit generates a synthesized resultant image by performing a predetermined operation designated in the blendingOp field with respect to a result obtained by multiplying the value designated in srcBlending field to the source image and a result obtained by multiplying the value designated in the dstBlending field to the resultant image.

35. The apparatus according to claim 33, further comprising a test unit performing a transparency test on the source image by comparing the transparency of the source image with the reference value designated in the alphaRef field using the designated operation designated in the alphaOp operation and generating and outputting a signal for operating the image synthesis unit when the source image passes the transparency test.

36. An apparatus for expressing effects in a 3-dimensional image, comprising:
   a memory storing information on nodes defined in VRML (Virtual Reality Modeling Language) respectively defining effects relative to an object of the 3-dimensional image, different from other-object nodes in VRML respectively identifying effects relative to another object of the 3-dimenionsl image, with one or more of the defined nodes having plural fields representing different effects and the one or more defined nodes being used to express multiple effects including one or more effects expressed on the object of the 3-dimensional image and one or more effects expressed on the 3-dimensional image;
   a file analysis unit analyzing the defined nodes stored in the memory to output the information on the multiple effects; and
   a multiple effect synthesis unit synthesizing the multiple textures in the 3-dimensional image using the information on the analyzed defined nodes.

37. The apparatus according to claim 36, wherein the multiple textures include at least one of:
   a MipMap texture for expressing a texture having a size proportional to a size of the 3-dimensional image in the screen space defined by a MipMap texture node; and
   a cubeEnvironment texture for reflecting environment images of the 3-dimensional space on the 3-dimensional object defined by a cubeEnvironment texture node.

38. The apparatus according to claim 36, wherein the multiple texture synthesis unit comprises:
   a texture expressing unit expressing the multiple texture in the 3-dimensional image;
   a texture image buffer storing the texture images input from the texture expression unit;
   a result image buffer storing a resultant image obtained by expressing the effects in the 3-dimensional image; and
   an image synthesis unit synthesizing the texture image stored in the texture image buffer into the resultant image stored in the result image buffer.

39. The apparatus according to claim 38, wherein the texture expression unit partitions the 3-dimensional object into triangles and performs a predetermined operation at pixel levels of the triangles using the textures to be expressed.

40. The apparatus according to claim 38, wherein one or more of the defined nodes for the multiple effects includes at least one of:
   a tfactorColor field designating a basic color;
   a tfactorAlpha field designating a basic transparency value;
   a colorStages field designating an operation used to blend colors of images in which the multiple textures are expressed;
   an alphaStages field designating an operation used to determine transparency of a resultant image in which the multiple textures are synthesized;
   a textureIndices field designating the multiple textures to be expressed in the 3-dimensional image;
   a texGeneration field designating coordinate values of the multiple textures; and
   a texTransformIndices field designating transform information on the multiple textures.

41. The apparatus according to claim 40, wherein the image synthesis unit comprises:
   a color operation unit calculating a color of the synthesized resultant image by performing the operation designated in colorStages field using at least one of the color of the resultant image, the color of the texture image, and the basic color designated in the tfactorColor field; and
   a transparency operation unit calculating transparency of the synthesized resultant image by performing the operation designated in the alphaStages field using at least one of the transparency of the resultant image, the transparency of the texture mage, and the basic transparency designated in the tfactorAlpha field.

* * * * *

UNITED STATES PATENT AND TRADEMARK OFFICE
CERTIFICATE OF CORRECTION

PATENT NO. : 7,598,951 B2  Page 1 of 1
APPLICATION NO. : 11/356082
DATED : October 6, 2009
INVENTOR(S) : Lee et al.

It is certified that error appears in the above-identified patent and that said Letters Patent is hereby corrected as shown below:

Column 21, Line 40, change "refection" to --reflection--.

Column 23, Line 50, change "mage," to --image,--.

Column 25, Line 2, change "images." to --images;--.

Column 25, Line 43, change "alpha Ref" to --alphaRef--.

Column 27, Line 23, change "3-dimenionsl" to --3-dimensional--.

Column 28, Line 42, change "mage," to --image,--.

Signed and Sealed this

Nineteenth Day of January, 2010

David J. Kappos
*Director of the United States Patent and Trademark Office*